United States Patent
Ueno et al.

(10) Patent No.: US 9,619,048 B2
(45) Date of Patent: Apr. 11, 2017

(54) DISPLAY DEVICE

(75) Inventors: Yasuhiro Ueno, Yokohama-shi, Kanagawa (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 738 days.

(21) Appl. No.: 13/479,662

(22) Filed: May 24, 2012

(65) Prior Publication Data

US 2012/0299909 A1    Nov. 29, 2012

(30) Foreign Application Priority Data

May 27, 2011   (JP) ................................. 2011-119688

(51) Int. Cl.
  *G06T 15/00*   (2011.01)
  *G06F 3/0346*  (2013.01)
  *G06F 3/01*    (2006.01)
  *H04N 13/04*   (2006.01)

(52) U.S. Cl.
  CPC ............ *G06F 3/0346* (2013.01); *G06F 3/011* (2013.01); *H04N 13/0497* (2013.01)

(58) Field of Classification Search
  CPC ......... G06T 19/00; G06T 17/20; G06T 17/00; G06T 15/10; G06T 15/00
  USPC .................. 715/859, 860; 345/419
  See application file for complete search history.

(56) References Cited

U.S. PATENT DOCUMENTS

| | | | |
|---|---|---|---|
| 5,381,158 A * | 1/1995 | Takahara et al. | 345/156 |
| 5,565,888 A * | 10/1996 | Selker | 715/823 |
| 5,736,974 A * | 4/1998 | Selker | 715/862 |
| 6,191,773 B1 * | 2/2001 | Maruno et al. | 345/158 |
| 6,222,465 B1 * | 4/2001 | Kumar et al. | 341/20 |
| 6,243,054 B1 * | 6/2001 | DeLuca | 345/7 |
| 6,624,833 B1 * | 9/2003 | Kumar et al. | 715/863 |
| 6,816,176 B2 * | 11/2004 | Laffey et al. | 715/860 |
| 6,992,666 B2 * | 1/2006 | Hiraki et al. | 345/419 |
| 7,023,436 B2 * | 4/2006 | Segawa et al. | 345/420 |
| 7,227,526 B2 * | 6/2007 | Hildreth et al. | 345/156 |
| 7,348,963 B2 * | 3/2008 | Bell | 345/156 |

(Continued)

FOREIGN PATENT DOCUMENTS

| | | | |
|---|---|---|---|
| JP | 58-89287 A | 5/1983 |
| JP | 5-189484 A | 7/1993 |

(Continued)

OTHER PUBLICATIONS

Christoph W. Borst, Arun P. Indugula, "Realistic Virtual Grasping," Proceedings of the 2005 IEEE Conference 2005 on Virtual Reality, pp. 91-98 and 320, Mar. 12-16, 2005.*

(Continued)

*Primary Examiner* — Ke Xiao
*Assistant Examiner* — Gordon Liu
(74) *Attorney, Agent, or Firm* — Hauptman Ham, LLP

(57) ABSTRACT

According to an aspect, a display device includes a display unit, a detecting unit, and a control unit. The display unit stereoscopically displays a display object. The detecting unit detects a first object and a second object in a three-dimensional space where the display object is displayed. The control unit changes the display object when a case is detected in which the display object is located between the first object and the second object in the three-dimensional space.

24 Claims, 20 Drawing Sheets

(56) References Cited

U.S. PATENT DOCUMENTS

| | | | | |
|---|---|---|---|---|
| 7,434,177 | B1* | 10/2008 | Ording et al. | 715/862 |
| 7,519,223 | B2* | 4/2009 | Dehlin et al. | 382/203 |
| 7,598,942 | B2* | 10/2009 | Underkoffler et al. | 345/158 |
| 7,701,439 | B2* | 4/2010 | Hillis et al. | 345/156 |
| 7,862,415 | B1 | 1/2011 | Ghaly | |
| 8,072,470 | B2* | 12/2011 | Marks | 345/632 |
| 8,166,421 | B2* | 4/2012 | Magal et al. | 715/863 |
| 8,451,268 | B1* | 5/2013 | Reisman et al. | 345/419 |
| 8,531,396 | B2* | 9/2013 | Underkoffler et al. | 345/158 |
| 8,559,676 | B2* | 10/2013 | Hildreth | 382/107 |
| 8,881,051 | B2* | 11/2014 | Frey et al. | 715/800 |
| 8,897,491 | B2* | 11/2014 | Ambrus et al. | 382/103 |
| 9,275,608 | B2 | 3/2016 | Ueno et al. | |
| 2003/0007015 | A1* | 1/2003 | Laffey et al. | 345/860 |
| 2006/0098873 | A1* | 5/2006 | Hildreth et al. | 382/181 |
| 2006/0161870 | A1* | 7/2006 | Hotelling et al. | 715/863 |
| 2007/0132721 | A1* | 6/2007 | Glomski et al. | 345/156 |
| 2007/0152958 | A1 | 7/2007 | Ahn et al. | |
| 2008/0168403 | A1* | 7/2008 | Westerman et al. | 715/863 |
| 2008/0212836 | A1* | 9/2008 | Fujimura et al. | 382/103 |
| 2009/0077504 | A1* | 3/2009 | Bell et al. | 715/863 |
| 2010/0095206 | A1* | 4/2010 | Kim | 715/702 |
| 2010/0134411 | A1 | 6/2010 | Tsumura et al. | |
| 2010/0199221 | A1* | 8/2010 | Yeung et al. | 715/850 |
| 2010/0280988 | A1* | 11/2010 | Underkoffler et al. | 706/58 |
| 2010/0281440 | A1* | 11/2010 | Underkoffler et al. | 715/863 |
| 2010/0315413 | A1* | 12/2010 | Izadi et al. | 345/419 |
| 2010/0328438 | A1 | 12/2010 | Ohyama et al. | |
| 2011/0022982 | A1 | 1/2011 | Takaoka | |
| 2011/0093778 | A1* | 4/2011 | Kim | G06F 3/041 715/702 |
| 2011/0109577 | A1* | 5/2011 | Lee et al. | 345/173 |
| 2011/0148918 | A1 | 6/2011 | Ishizawa et al. | |
| 2011/0164032 | A1* | 7/2011 | Shadmi | 345/419 |
| 2011/0191707 | A1 | 8/2011 | Lee et al. | |
| 2011/0193939 | A1* | 8/2011 | Vassigh et al. | 348/46 |
| 2011/0310100 | A1 | 12/2011 | Adimatyam et al. | |
| 2012/0032917 | A1 | 2/2012 | Yamaguchi | |
| 2012/0117514 | A1* | 5/2012 | Kim et al. | 715/849 |
| 2012/0194505 | A1* | 8/2012 | Beck | G09G 5/363 345/419 |
| 2012/0268410 | A1 | 10/2012 | King et al. | |
| 2012/0306856 | A1 | 12/2012 | Tada | |

FOREIGN PATENT DOCUMENTS

| | | |
|---|---|---|
| JP | 10-99543 A | 4/1998 |
| JP | 11-250283 A | 9/1999 |
| JP | 2000-184398 A | 6/2000 |
| JP | 2002-123840 A | 4/2002 |
| JP | 2003-24631 A | 1/2003 |
| JP | 2005-316790 A | 11/2005 |
| JP | 2007-086931 A | 4/2007 |
| JP | 2010-55507 A | 3/2010 |
| JP | 2011-13778 A | 1/2011 |
| JP | 2011-28534 A | 2/2011 |
| JP | 2011-96171 A | 5/2011 |
| JP | 2011-101677 A | 5/2011 |
| JP | 2011095547 A | 5/2011 |
| JP | 2012-115414 A | 6/2012 |
| WO | 2009/127701 A1 | 10/2009 |

OTHER PUBLICATIONS

Buchmann, Volkert, et al., "FingARtips: gesture based direct manipulation in Augmented Reality," Proceedings of the 2nd international conference on Computer graphics and interactive techniques in Australasia and South East Asia, ACM, 2004.*

Dewaele, Guillaume, and Marie-Paule Cani, "Interactive Global and Local Deformations for Virtual Clay," Proceedings of the 11th Pacific Conference on Computer Graphics and Applications, IEEE Computer Society, 2003.*

Hilliges, Otmar, et al., "Interactions in the air: adding further depth to interactive tabletops," Proceedings of the 22nd annual ACM symposium on User interface software and technology, ACM, 2009.*

Wan Huagen; Gao Shuming; Peng Qunsheng, "Virtual Grasping for Virtual Assembly Tasks," Proceedings of the Third International Conference on Image and Graphics, IEEE Computer Society, 2004.*

Jota, Ricardo, et al. "The Continuous Interaction Space: Interaction Techniques Unifying Touch and Gesture on and above a Digital Surface," Gesture, (2011).*

Segen, Jakub, and Senthil Kumar. "Shadow Gestures: 3D Hand Pose Estimation Using a Single Camera." 2013 IEEE Conference on Computer Vision and Pattern Recognition. vol. 1. IEEE Computer Society, 1999.*

Tzafestas, C. S. "Whole-hand kinesthetic feedback and haptic perception in dextrous virtual manipulation." IEEE Transactions on Systems, Man, and Cybernetics, Part A: Systems and Humans 33.1 (2003): 100-113.*

Thomas Ullmann, Joerg Sauer, "Intuitive Virtual Grasping for Non Haptic Environments," Proceedings of the 8th Pacific Conference on Computer Graphics and Applications, Oct. 3-5, 2000.*

Zhao, Ji, et al., "MobileSurface: interaction in the air for mobile computing,"Adjunct proceedings of the 23nd annual ACM symposium on User interface software and technology, ACM, Oct. 2010.*

Cui, Tong, Jing Xiao, and Aiguo Song. "Simulation of grasping deformable objects with a virtual human hand." IEEE/RSJ International Conference on Intelligent Robots and Systems, 2008. IROS 2008.*

Buchmann, Volkert, et al. "FingARtips: gesture based direct manipulation in Augmented Reality." Proceedings of the 2nd international conference on Computer graphics and interactive techniques in Australasia and South East Asia. ACM, 2004.*

J.-P. Gourret, N. M. Thalmann, and D. Thalmann. 1989. Simulation of object and human skin formations in a grasping task. In Proceedings of the 16th annual conference on Computer graphics and interactive techniques (SIGGRAPH '89). ACM, New York, NY, USA, 21-30.*

Hui, Kin Chuen, and M. C. Ma. "Deforming virtual objects with an instrumented glove." Computer Graphics International, 1998. Proceedings. IEEE, 1998.*

Kolaric, Sinisa, Alberto Raposo, and Marcelo Gattass. "Direct 3D manipulation using vision-based recognition of uninstrumented hands." X Symposium on Virtual and Augmented Reality. 2008.*

Nishino, Hiroaki, Kouichi Utsumiya, and Kazuyoshi Korida. "3d object modeling using spatial and pictographic gestures." Proceedings of the ACM symposium on Virtual reality software and technology. ACM, 1998.*

Popescu, V., Grigore Burdea, and Mourad Bouzit. "Virtual reality simulation modeling for a haptic glove." Computer Animation, 1999. Proceedings. IEEE, 1999.*

Office Action mailed Sep. 9, 2014, corresponding to Japanese patent application No. 2011-119688, for which an explanation of relevance is attached.

Office Action mailed Oct. 28, 2014, corresponding to Japanese Patent Application No. 2011-143070, for which an explanation of relevance is attached.

Office Action mailed Apr. 21, 2015, corresponding to Japanese patent application No. 2011-143070, for which an explanation of relevance is attached.

Office Action mailed Nov. 17, 2015, corresponding to Japanese Patent Application No. 2014-255613, for which an explanation of relevance is attached.

Office Action mailed Jun. 29, 2015, corresponding to U.S. Appl. No. 13/532,885.

Office Action mailed Apr. 7, 2015, corresponding to Japanese patent application No. 2011-143342, for which an explanation of relevance is attached.

Office Action in JP Application No. 2015-252372, dated Sep. 13, 2016, for which an explanation of relevance is attached.

Office Action in JP Application No. 2014-255613, dated Sep. 13, 2016, for which an explanation of relevance is attached.

(56) References Cited

OTHER PUBLICATIONS

Office Action in JP Application No. 2014-255613 mailed Mar. 29, 2016, for which an explanation of relevance is attached.
Asako Kimura et al, "Function Design and Evaluation of Tool Device Facilitating Pick and Move Manipulation in Spatial Works", Journal of Information Processing Society of Japan, vol. 51, No. 2, Feb. 15, 2010, pp. 314-323, Japan, for which partial translation is attached.
Office Action in U.S. Appl. No. 15/001,191, mailed Mar. 24, 2016.

* cited by examiner

DISPLAY DEVICE

CROSS-REFERENCE TO RELATED APPLICATIONS

This application claims priority from Japanese Application No. 2011-119688, filed on May 27, 2011, the content of which is incorporated by reference herein in its entirety.

BACKGROUND

1. Technical Field

The present disclosure relates to a display device.

2. Description of the Related Art

Some display devices such as mobile phones with a display unit can stereoscopically display an image and so on (see e.g., Japanese Patent Application Laid-open No. 2011-95547). The three-dimensional display is implemented by using binocular disparity.

The three-dimensional display is a user-friendly display manner; however, it has been used just for viewing purposes, and has not been used for improving the convenience of operations.

For the foregoing reasons, there is a need for a display device that can provide the user with convenient operations using the three-dimensional display.

SUMMARY

According to an aspect, a display device includes a display unit, a detecting unit, and a control unit. The display unit stereoscopically displays a display object. The detecting unit detects a first object and a second object in a three-dimensional space where the display object is displayed. The control unit changes the display object when a case is detected in which the display object is located between the first object and the second object in the three-dimensional space.

According to another aspect, a display device includes a display unit, a detecting unit, and a control unit. The display unit stereoscopically displays a display object. The detecting unit detects a first object and a second object in a three-dimensional space where the display object is displayed. The control unit changes the display object when a case is detected in which at least one of the first object and the second object is located in a position where it is in contact with the display object in the three-dimensional space.

According to another aspect, a display device includes a display unit and a control unit. The display unit stereoscopically displays a display object. The control unit changes the display object when a first object and a second object are located in positions where the display object is sandwiched therebetween in a three-dimensional space where the display object is displayed.

According to another aspect, a display device includes a display unit, a detecting unit, and a control unit. The display unit displays a display object on its display surface. The detecting unit detects a first object and a second object on the display surface. The control unit changes the display object when it is detected that the display object is located between the first object and the second object on the display surface.

According to another aspect, a display device includes a display unit, a detecting unit, and a control unit. The display unit displays a display object on its display surface. The detecting unit detects a first object and a second object on the display surface. The control unit changes the display object when it is detected that at least one of the first object and the second object is located in a position where it is in contact with the display object on the display surface.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (PDA), portable navigation units, personal computers (including but not limited to tablet computers, netbooks etc.), media players, portable electronic reading devices, and gaming devices. The present invention can also be applied to stationary electronic devices that have a plurality of display units.

Figure 1:
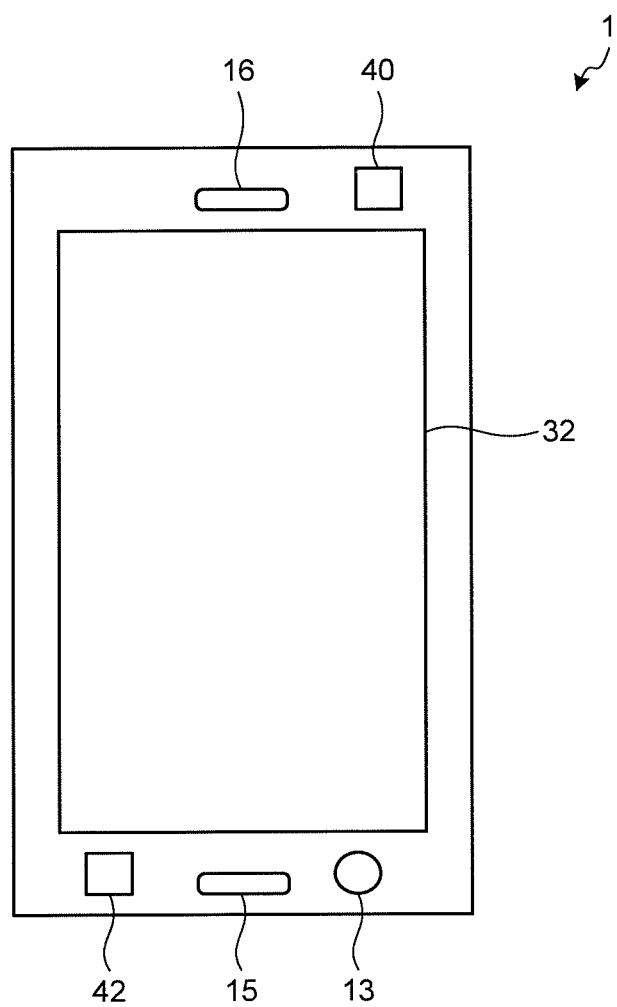
FIG. 1 is a front view of a mobile phone according to a first embodiment.
Figure 2:
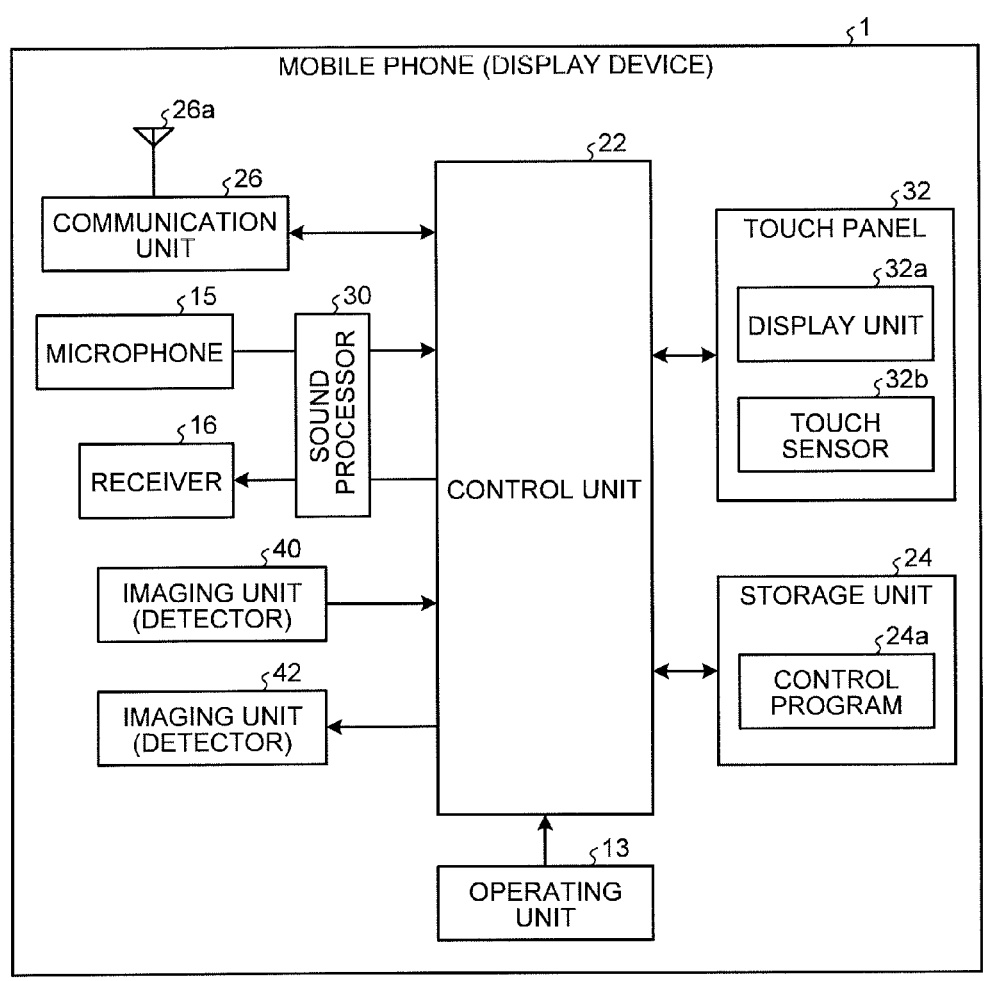
FIG. 2 is a block diagram of the mobile phone according to the first embodiment.

First of all, the configuration of a mobile phone (display device) 1 according to a first embodiment will be explained below with reference to FIG. 1 and FIG. 2. FIG. 1 is a front view of the mobile phone 1. FIG. 2 is a block diagram of the mobile phone 1.

As illustrated in FIG. 1 and FIG. 2, the mobile phone 1 includes an operating unit 13, a microphone 15, a receiver 16, a control unit 22, a storage unit 24, a communication unit 26, a sound processor 30, a touch panel 32, an imaging unit 40, and an imaging unit 42. The operating unit 13, the microphone 15, the receiver 16, the touch panel 32, and the imaging unit 40 are exposed to the front surface of the mobile phone 1.

The operating unit 13 has physical button, and outputs a signal corresponding to a pressed button to the control unit 22. In the example illustrated in FIG. 1, the operating unit 13 has only one button; however, the operating unit 13 may have a plurality of buttons.

The microphone 15 acquires an external sound. The receiver 16 outputs a voice of a call partner during a phone call. The sound processor 30 converts the sound input from the microphone 15 to a digital signal and outputs the digital signal to the control unit 22. The sound processor 30 also decodes a digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The touch panel 32 displays various pieces of information such as characters, graphics, and images, and detects an input operation performed on a display area such as icon, button, and character input area. The touch panel 32 is structured with a display unit 32a and a touch sensor 32b so as to overlap each other.

The display unit 32a includes a display device such as a liquid crystal display (LCD) or an organic electro-luminescence display (OELD), and displays various pieces of information according to a control signal input from the control unit 22. The touch sensor 32b detects an input operation performed on the surface of the touch panel 32, and outputs a signal corresponding to the detected input operation to the control unit 22. The detection method in which the touch sensor 32b detects various operations may be any detection method, such as a capacitive type detection method, a resistive type detection method, and a pressure sensitive type detection method.

The touch panel 32 can display a three-dimensional object. A "three-dimensional object" is a display object such as an image and a shape created so as to look as if the display object is three-dimensional using disparity. The method of displaying the three-dimensional object may be a method of realizing a stereoscopic vision using a tool such as glasses, or may be a method of realizing a stereoscopic vision with the naked eye.

The imaging units 40 and 42 electronically photograph an image using an image sensor such as a charge-coupled device (CCD) image sensor or a complementary metal oxide semiconductor (CMOS) image sensor. The imaging units 40 and 42 convert a photographed image to a signal and outputs the signal to the control unit 22. The imaging units 40 and 42 also function as a detector that detects an object for selecting and operating a three-dimensional object in a space in which the three-dimensional object is stereoscopically displayed (hereinafter, also referred to "three-dimensional space").

The imaging units 40 and 42 are configured to set a field angle and layout so that, even if an object such as a finger is located in any part of the three-dimensional space, the object can be photographed. The imaging units 40 and 42 may be a device that acquires an image of visible light or may be a device that acquires an image of invisible light such as infrared rays.

The control unit 22 includes a central processing unit (CPU) being a processing unit and a memory being a storage unit, and implements various functions by executing programs using these hardware resources. Specifically, the control unit 22 reads a program or data stored in the storage unit 24 to load it to the memory, and causes the CPU to execute instructions contained in the program loaded to the memory. The control unit 22 performs read/write of data from/to the memory and the storage unit 24, and controls operations of the communication unit 26, the display unit 32a, and the like according to the execution result of the instructions executed by the CPU. When the CPU executes instructions, the data loaded to the memory and the signal input from the touch sensor 32b or so are used as part of parameters and determination conditions.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various programs and data. Examples of the program stored in the storage unit 24 include a control program 24a. The storage unit 24 may include a combination of a portable storage medium such as a memory card and a reader/writer for reading/writing data from/to the storage medium. In this case, the control program 24a may be stored in the storage medium. The control program 24a may be acquired from any other device such as a server through communication by the communication unit 26.

The control program 24a provides functions for various controls to operate the mobile phone 1. The function provided by the control program 24a includes a function for controlling a display of a three-dimensional object on the touch panel 32 and a function for detecting a user's operation performed for the three-dimensional object displayed by the touch panel 32.

Figure 3:
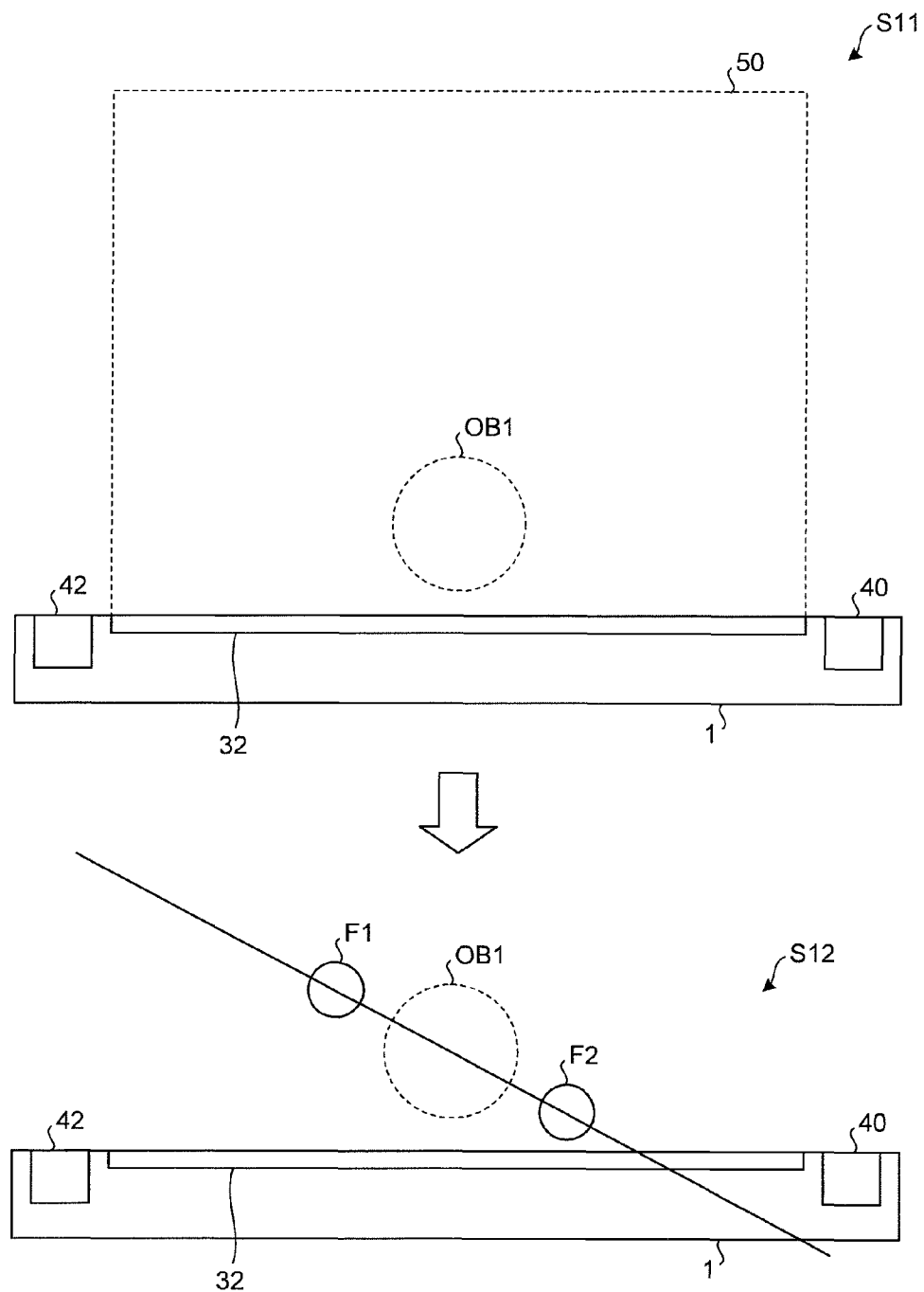
FIG. 3 is a diagram for explaining how to detect an operation performed for a three-dimensional object according to the first embodiment.

Then, detection of an operation performed for a three-dimensional object will be explained with reference to FIG. 3. FIG. 3 is a diagram for explaining how to detect an operation performed for a three-dimensional object. At Step S11 illustrated in FIG. 3, the touch panel 32 stereoscopically displays a three-dimensional object OB1 in a three-dimensional space 50. The three-dimensional object OB1 is, for example, an object resembling a ball.

Here, it is assumed that the user wishes to perform some operation for the three-dimensional object OB1. To perform some operation for the three-dimensional object OB1, first of all, the three-dimensional object OB1 has to be selected as an operation object. To select the three-dimensional object OB1, as illustrated at Step S12, the user moves a finger F1 and a finger F2 so that the three-dimensional object OB1 is located between the finger F1 and the finger F2, and maintains this state for a longer period of time than a predetermined time.

When the two objects are detected within the three-dimensional space and the state in which a three-dimensional object OB1 is located (displayed) between the two objects continues for the longer period of time than the predetermined time, the mobile phone 1 determines that the three-dimensional object OB1 is selected, and sets the three-dimensional object OB1 to be in a selected state. The mobile phone 1 changes, or so, a display mode of the three-dimensional object OB1 to notify the user that the three-dimensional object OB1 is in the selected state.

The determination as to whether the three-dimensional object OB1 is located between the two objects is performed based on actual positions of the two objects in the three-dimensional space and a calculated position of the three-dimensional object OB1 in the three-dimensional space.

The positions of the two objects are calculated based on images photographed by the imaging units 40 and 42. The positions of the two objects may be calculated based on previously registered sizes of the objects, sizes of the objects in the images, and positions of the objects in the images. The positions of the two objects may also be calculated by comparing the sizes and the positions of the objects in the image photographed by the imaging unit 40 with the sizes and the positions of the objects in the image photographed by the imaging unit 42. The detection of the object such as the finger can be implemented using a known technology. When the object is the finger, the process may be performed by setting a position of the tip of the finger as a position of the object.

A calculated position of the three-dimensional object OB1 in the three-dimensional space is calculated based on a position of the three-dimensional object OB1 on the display surface of the touch panel 32 and an amount of "floating" of the three-dimensional object OB1 in the three-dimensional space. The amount of floating of the three-dimensional object OB1 in the three-dimensional space is calculated from, for example, a difference between positions of the three-dimensional object OB1 in an image for a right eye and in an image for a left eye, which are used to stereoscopically display the three-dimensional object OB1.

The notification indicating that it is in the selected state is implemented by, for example, changing the whole color of the three-dimensional object OB1 or changing a color near a location, within the surface of the three-dimensional object OB1, intersecting a line connecting the two objects. Instead of or in addition to such visual notification, a sound or a vibration may be used to perform the notification.

In this way, when the state where the three-dimensional object OB1 is located between the actual objects such as the fingers is continuously detected for a longer period of time than a predetermined time, the mobile phone 1 determines that the three-dimensional object OB1 has been selected. An operation such that the fingers are placed so as to sandwich the three-dimensional object OB1 therebetween is similar to an operation of a person who pinches an object in order to select an actual object. Therefore, such an operation is intuitive and easy to understand as an operation for selecting the three-dimensional object OB1. In addition, by adding the continuous detection of the state for the longer period of time than the predetermined time to the condition, an unintended three-dimensional object can be prevented from being selected during the process of moving the fingers in order to select another three-dimensional object.

The objects used to operate the three-dimensional object are not limited to the fingers, and therefore may be hands, feet, sticks, setting pins, or so. Even when the two objects are not parallel to the display surface of the touch panel 32, that is, even when the line connecting the two objects intersects the display surface of the touch panel 32 or intersects a horizontal plane parallel to the display surface thereof, the mobile phone 1 sets the three-dimensional object to be in the selected state based on the condition. In this way, the stereoscopic determination as to whether the three-dimensional object has been selected makes it easy to perform the selection operation according to the shape of the three-dimensional object.

To stereoscopically determine whether the three-dimensional object has been selected, a plurality of imaging units are desirably prepared to photograph the finger F1, the finger F2, and so on from different directions so that an obstacle will not cause a blind spot.

After it is determined that the three-dimensional object OB1 is in the selected state, the mobile phone 1 adds a change such as movement, deformation, or deletion to the three-dimensional object OB1 according to movements of the finger F1 and the finger F2.

Figure 4:
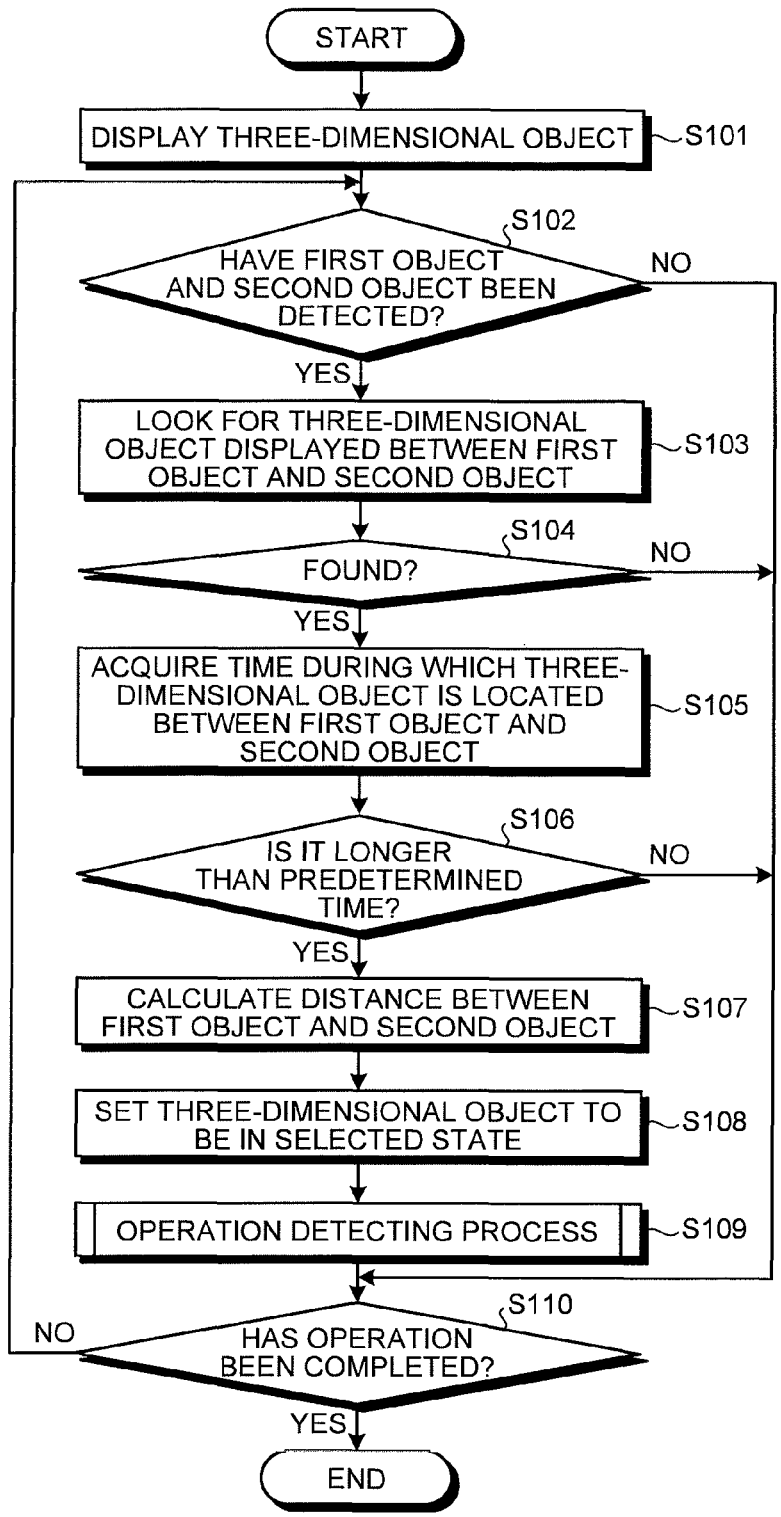
FIG. 4 is a flowchart of a procedure of a selection detecting process.

Then, a procedure performed by the mobile phone 1 related to the operations of the three-dimensional object will be explained with reference to FIG. 4 and FIG. 5. FIG. 4 is a flowchart of a procedure of the selection detecting process of the three-dimensional object. The procedure illustrated in FIG. 4 is implemented by the control unit 22 executing the control program 24a triggered by detection of a predetermined operation or the like.

As illustrated in FIG. 4, first of all, at Step S101, the control unit 22 stereoscopically displays a three-dimensional object. The data used to display the three-dimensional object may be previously stored in the storage unit 24 or may be acquired from any other device such as a server through communication by the communication unit 26.

Subsequently, at Step S102, the control unit 22 determines whether detecting units, that is, the imaging units 40 and 42 have detected a first object and a second object. The first object and the second object are, for example, user's fingers. When the first object and the second object have not been detected (No at Step S102), then at Step S110, the control unit 22 determines whether operation completion has been detected.

The operation completion may be detected when a predetermined operation is performed on the operating unit 13, or may be detected when a predetermined operation is performed on the touch panel 32. The operation completion may also be detected when a predetermined gesture of user's hand is photographed by at least one of the imaging units 40 and 42. When the operation completion has been detected (Yes at Step S110), the control unit 22 ends the selection detecting process. When the operation completion has not been detected (No at Step S110), the control unit 22 re-executes Step S102 and the subsequent steps.

When the first object and the second object have been detected (Yes at Step S102), then at Step S103, the control unit 22 looks for a three-dimensional object displayed between the first object and the second object, from among displayed three-dimensional objects. When the three-dimensional object is not found (No at Step S104), then at Step S110, the control unit 22 determines whether the operation completion has been detected. When the operation completion has been detected (Yes at Step S110), the control unit 22 ends the selection detecting process. When the operation completion has not been detected (No at Step S110), the control unit 22 re-executes Step S102 and the subsequent steps.

When the three-dimensional object displayed between the first object and the second object is found (Yes at Step S104), then at Step S105, the control unit 22 acquires a time during which the three-dimensional object is located between the first object and the second object. When the acquired time is not longer than a predetermined time (No at Step S106), then at Step S110, the control unit 22 determines whether the operation completion has been detected. When the operation completion has been detected (Yes at Step S110), the control unit 22 ends the selection detecting process. When the operation completion has not been detected (No at Step S110), the control unit 22 re-executes Step S102 and the subsequent steps.

When the acquired time is longer the predetermined time (Yes at Step S106), then at Step S107, the control unit 22 calculates a distance between the first object and the second object. At Step S108, the control unit 22 sets the three-dimensional object displayed between the first object and the second object to be in the selected state. At Step S109, the control unit 22 executes an operation detecting process explained later, and changes, during its execution, the three-dimensional object in the selected state according to the detected operation. After the end of the operation detecting process, the control unit 22 determines at Step S110 whether the operation completion has been detected. When the operation completion has been detected (Yes at Step S110), the control unit 22 ends the selection detecting process. When the operation completion has not been detected (No at Step S110), the control unit 22 re-executes Step S102 and the subsequent steps.

Figure 5:
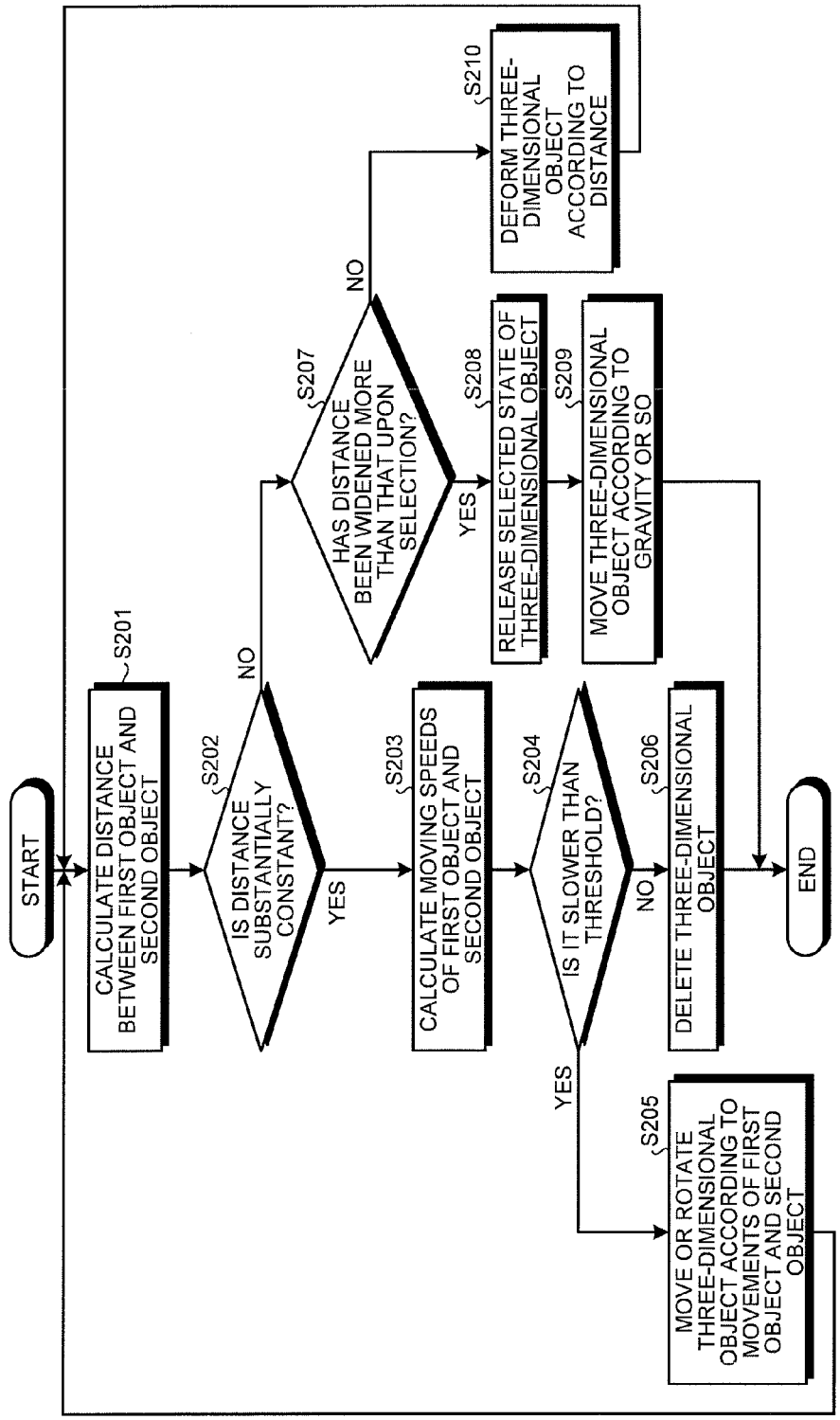
FIG. 5 is a flowchart of a procedure of an operation detecting process.

FIG. 5 is a flowchart of a procedure of the operation detecting process. The procedure illustrated in FIG. 5 is implemented by the control unit 22 executing the control program 24a.

As illustrated in FIG. 5, first of all, at Step S201, the control unit 22 calculates a distance between the first object and the second object. Then at Step S202, the control unit 22 determines whether the distance between the first object and the second object after the operation detecting process is started is substantially constant. The distance being substantially constant means that, for example, a change amount of the distance between the first object and the second object at a current time point falls within a predetermined range (which is ±10% or so of a maximum change amount of the distance when the first object and the second object move at a normal speed), as compared with the distance at the time of starting the operation detecting process. When the distance between the first object and the second object is continuously reduced after the start of the operation detecting process (when the first object and the second object are moving in a direction of crushing the three-dimensional object), it may be determined that the distance is substantially constant. When the distance between the two changes only within a range due to the shaky movement of the hand, it may be determined that the distance is substantially constant.

When the distance between the first object and the second object is substantially constant (Yes at Step S202), then at Step S203, the control unit 22 calculates moving speeds of the first object and the second object. Subsequently, at Step S204, the control unit 22 determines whether each of the calculated moving speeds is slower than a threshold. The threshold used here is, for example, a moving speed of fingertips when one throws something. The moving speed compared with the threshold may be an average of the moving speed of the first object and the moving speed of the second object, or may be a higher one of them, or may be a lower one of them.

When the moving speed is slower than the threshold (Yes at Step S204), then at Step S205, the control unit 22 moves or rotates the three-dimensional object according to the movements of the detected first object and second object. For example, when it is detected that the first object and the second object move rightward, the control unit 22 moves the three-dimensional object rightward according to the movements of the first object and the second object. When it is detected that the first object and the second object rotate leftward, the control unit 22 rotates the three-dimensional object leftward according to the rotation of the first object and the second object. When the movement and the rotation are simultaneously detected, the movement and the rotation are simultaneously executed. If there is an obstacle against the movement and the rotation of the three-dimensional object, the movement and the rotation of the three-dimensional object may be stopped when the three-dimensional object comes in contact with the obstacle. The control unit 22 then re-executes Step S201 and the subsequent steps.

When the moving speed is not slower than the threshold (No at Step S204), then at Step S206, the control unit 22 deletes the three-dimensional object. When the three-dimensional object is to be deleted, an animation may be displayed as if the three-dimensional object flies toward a moving direction of the first object and the second object. The control unit 22 then ends the operation detecting process. In this manner, when the first object and the second object move at a high speed as if the three-dimensional object is thrown, the three-dimensional object is deleted; therefore, deletion of the three-dimensional object can be implemented with an intuitive operation. Instead of the operation for moving the first object and the second object at a high speed, for example, the deletion of the three-dimensional object may be assigned to the operation of crushing the three-dimensional object. Instead of deleting the three-dimensional object, the three-dimensional object may be returned to its initial location.

When the distance between the first object and the second object is not substantially constant (No at Step S202), then at Step S207, the control unit 22 determines whether the distance has been widened more than that upon selection of the three-dimensional object, that is, upon start of the operation detecting process. When the distance has been widened (Yes at Step S207), then at Step S208, the control unit 22 releases the selected state of the three-dimensional object. The operation of widening the distance between the first object and the second object is similar to an operation of releasing a pinched actual object. Therefore, such an operation is intuitive and easy to understand as an operation for releasing the selection of the three-dimensional object.

Subsequently, at Step S209, the control unit 22 moves the three-dimensional object, whose selected state has been released, according to gravity or so. The control unit 22 then ends the operation detecting process. The movement in this case is displayed in such a manner that the three-dimensional object falls according to gravity and stops on a floor or a table. Before the movement of the three-dimensional object is stopped, the three-dimensional object may be bounded according to the elasticity of the three-dimensional object and/or according to the hardness of the floor or the table. The magnitude of impact produced when the three-dimensional object strikes the floor or the table may be calculated, and if the impact is greater than a predetermined value, then the three-dimensional object may be displayed as if it is broken. The three-dimensional object may be moved more slowly than a case where actual gravity works.

When the distance between the first object and the second object has been reduced more than that upon selection of the three-dimensional object (No at Step S207), then at Step S210, the control unit 22 deforms the three-dimensional object according to the distance. The control unit 22 then re-executes Step S201 and the subsequent steps. The degree of deformation of the three-dimensional object may be changed according to, for example, the elasticity set as an attribute of the three-dimensional object. For an object whose hardness is set to be low as an attribute like a three-dimensional object resembling a rubber ball, the control unit 22 may increase the degree of the deformation according to how the distance between the first object and the second object is reduced. For an object whose hardness is set to be high as an attribute like a three-dimensional object resembling blocks, the control unit 22 may keep low the degree of deformation even if the distance between the first object and the second object is reduced.

When the distance between the first object and the second object is reduced more than that upon selection of the three-dimensional object, the size of the three-dimensional object may be reduced instead of deformation thereof. When the distance between the first object and the second object becomes the predetermined value or less, the three-dimensional object may be displayed as if it is broken.

As explained above, the first embodiment is configured so as to select a three-dimensional object if the state in which the three-dimensional object is located between the objects such as the fingers continues for the longer period of time than the predetermined time. Therefore, the selection of the three-dimensional object can be achieved with an intuitive and easy-to-understand operation.

Figure 6:
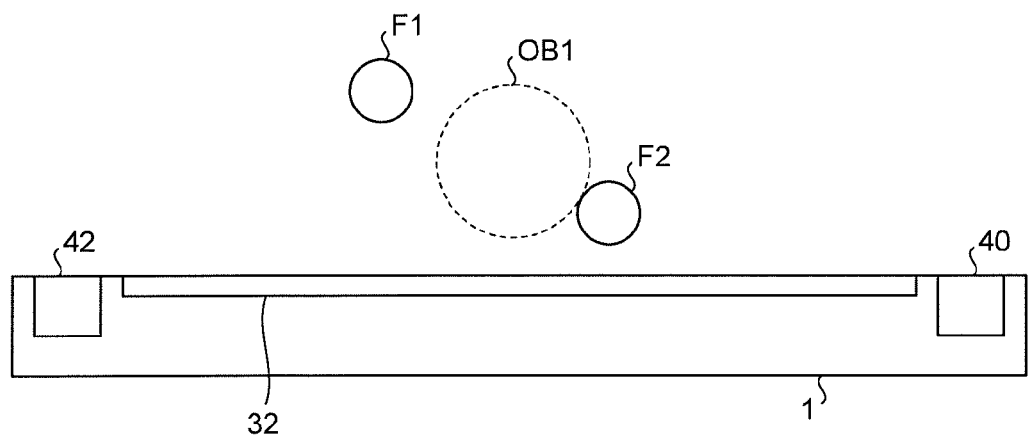
FIG. 6 is a diagram for explaining another example of how to detect an operation performed for the three-dimensional object.

As illustrated in FIG. 6, it may be set as the condition for selection that a state in which at least one of the first object and the second object is in contact with the three-dimensional object continues for the longer period of time than the predetermined time. If a plurality of three-dimensional objects are closely displayed, by setting the contact with the three-dimensional object as the condition for the selection, the user can easily select a desired three-dimensional object.

Figure 7:
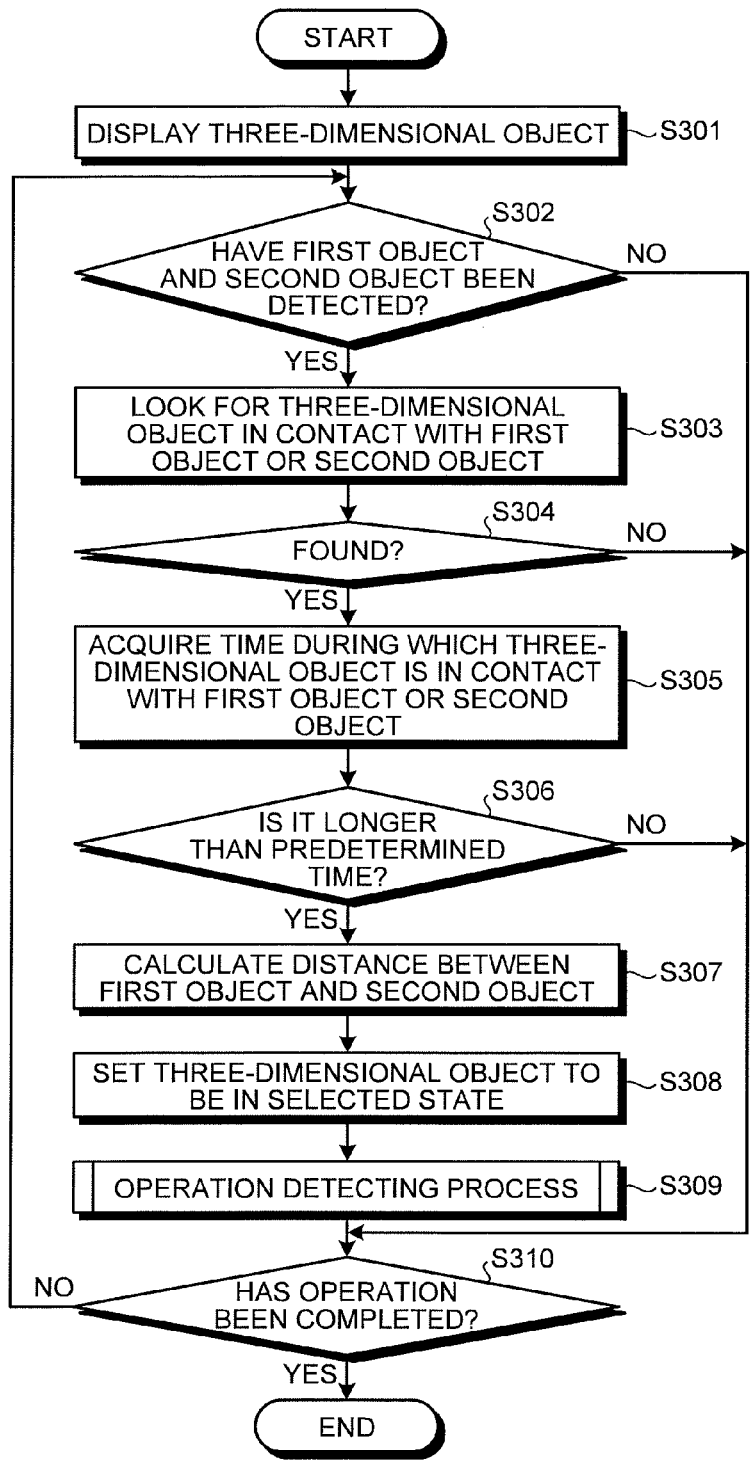
FIG. 7 is a flowchart of a procedure of the selection detecting process when a contact with the three-dimensional object is set as a condition for selection.

FIG. 7 is a flowchart of a procedure of the selection detecting process when a contact with the three-dimensional object is set as a condition for selection. As illustrated in FIG. 7, first of all, at Step S301, the control unit 22 stereoscopically displays a three-dimensional object. Subsequently, the control unit 22 determines whether the detecting units have detected the first object and the second object. When the first object and the second object have not been detected (No at Step S302), then at Step S310, the control unit 22 determines whether the operation completion has been detected. When the operation completion has been detected (Yes at Step S310), the control unit 22 ends the selection detecting process. When the operation completion has not been detected (No at Step S310), the control unit 22 re-executes Step S302 and the subsequent steps.

When the first object and the second object have been detected (Yes at Step S302), then at Step S303, the control unit 22 looks for a three-dimensional object in contact with at least one of the first object and the second object, from among displayed three-dimensional objects. When the three-dimensional object is not found (No at Step S304), then at Step S310, the control unit 22 determines whether the operation completion has been detected. When the operation completion has been detected (Yes at Step S310), the control unit 22 ends the selection detecting process. When the operation completion has not been detected (No at Step S310), the control unit 22 re-executes Step S302 and the subsequent steps.

When the three-dimensional object in contact with at least one of the first object and the second object is found (Yes at Step S304), then at Step S305, the control unit 22 acquires a time during which the three-dimensional object is located between the first object and the second object. When the acquired time is not longer than the predetermined time (No at Step S306), then at Step S310, the control unit 22 determines whether the operation completion has been detected. When the operation completion has been detected (Yes at Step S310), the control unit 22 ends the selection detecting process. When the operation completion has not been detected (No at Step S310), the control unit 22 re-executes Step S302 and the subsequent steps.

When the acquired time is longer than the predetermined time (Yes at Step S306), then at Step S307, the control unit 22 calculates a distance between the first object and the second object. At Step S308, the control unit 22 sets the three-dimensional object displayed between the first object and the second object to be in the selected state. At Step S309, the control unit 22 executes the operation detecting process, and changes, during its execution, the three-dimensional object in the selected state according to the detected operation. After the end of the operation detecting process, the control unit 22 determines at Step S310 whether the operation completion has been detected. When the operation completion has been detected (Yes at Step S310), the control unit 22 ends the selection detecting process. When the operation completion has not been detected (No at Step S310), the control unit 22 re-executes Step S302 and the subsequent steps.

A second embodiment will be explained below. The mobile phone 1 according to the second embodiment is different in a procedure of the selection detecting process executed based on the functions provided by the control program 24a from that according to the first embodiment; however, in terms of the hardware, it is configured in the same manner as that of the mobile phone 1 according to the first embodiment. Therefore, in the second embodiment, explanation that overlaps with the explanation in the first embodiment may be omitted, and the selection detecting process will be mainly explained below.

Figure 8:
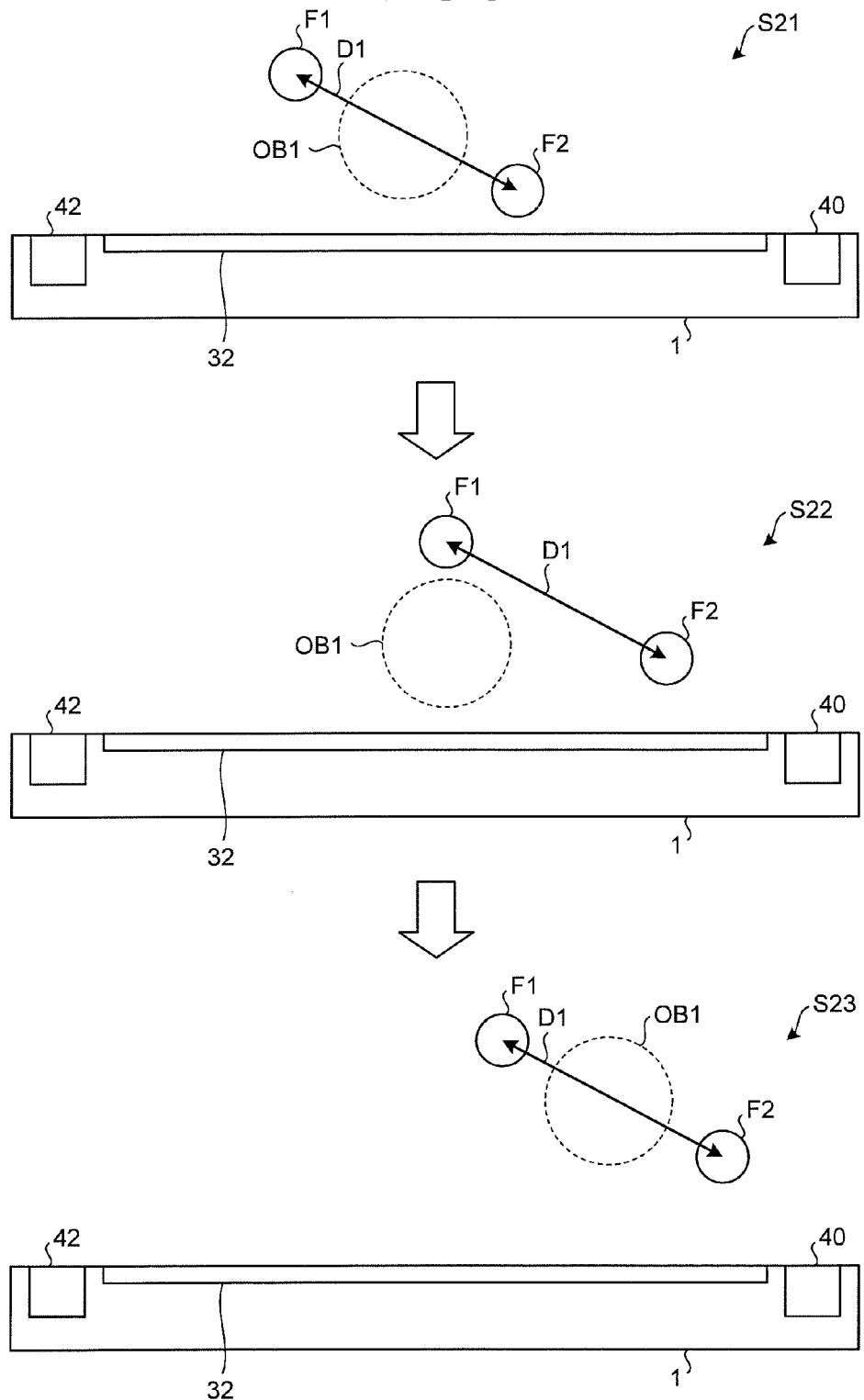
FIG. 8 is a diagram for explaining how to detect an operation performed for the three-dimensional object according to a second embodiment.

First of all, detection of an operation performed for a three-dimensional object will be explained with reference to FIG. 8. FIG. 8 is a diagram for explaining how to detect an operation performed for the three-dimensional object. At Step S21 illustrated in FIG. 8, the touch panel 32 stereoscopically displays the three-dimensional object OB1 in the three-dimensional space. To select the three-dimensional object OB1, the user moves the finger F1 and the finger F2 so that the three-dimensional object OB1 is located between the finger F1 and the finger F2.

When the two objects are detected within the three-dimensional space and the three-dimensional object OB1 is located between the two objects, the mobile phone 1 monitors a change in the distance between the two objects. When the distance is substantially constant for the longer period of time than a predetermined time, the mobile phone 1 determines that the three-dimensional object OB1 is selected, and sets the three-dimensional object OB1 to be in the selected state. The mobile phone 1 changes, or so, the display mode of the three-dimensional object OB1 to notify the user that the three-dimensional object OB1 is in the selected state.

There is no need for the two objects to remain in locations where the three-dimensional object OB1 is sandwiched therebetween while the mobile phone 1 monitors the change in the distance between the two objects. That is, the user moves the finger F1 and the finger F2 so that the three-dimensional object OB1 is located between the finger F1 and the finger F2 as illustrated at Step S21, and thereafter the user may move the finger F1 and the finger F2 to some other locations without maintaining the state.

It is assumed, as illustrated at Step S22, that the user moves the finger F1 and the finger F2 from the state of Step S21 while a distance D1 between the finger F1 and the finger F2 is maintained substantially constant. In this case, as illustrated at Step S23, the mobile phone 1 sets the three-dimensional object OB1 to be in the selected state when the state in which the distance D1 between the finger F1 and the finger F2 is maintained substantially constant continues for the longer period of time than the predetermined time. The mobile phone 1 then moves the three-dimensional object OB1 into position between the finger F1 and the finger F2 as if it is already selected at the stage of Step S21. The movements of the finger F1 and the finger F2 from Step S21 to Step S23 may be stored, and the three-dimensional object OB1 may be rotated or so according to the stored movements. Thereafter, the mobile phone 1 adds a change such as movement, deformation, or deletion to the three-dimensional object OB1 according to the movements of the finger F1 and the finger F2.

In this manner, the two objects are moved once to the locations where the three-dimensional object OB1 is sandwiched therebetween, and then, the three-dimensional object is set so as to be selectable even if the objects do not remain in the locations; therefore, the user can quickly start the operation after the three-dimensional object is selected.

Figure 9:
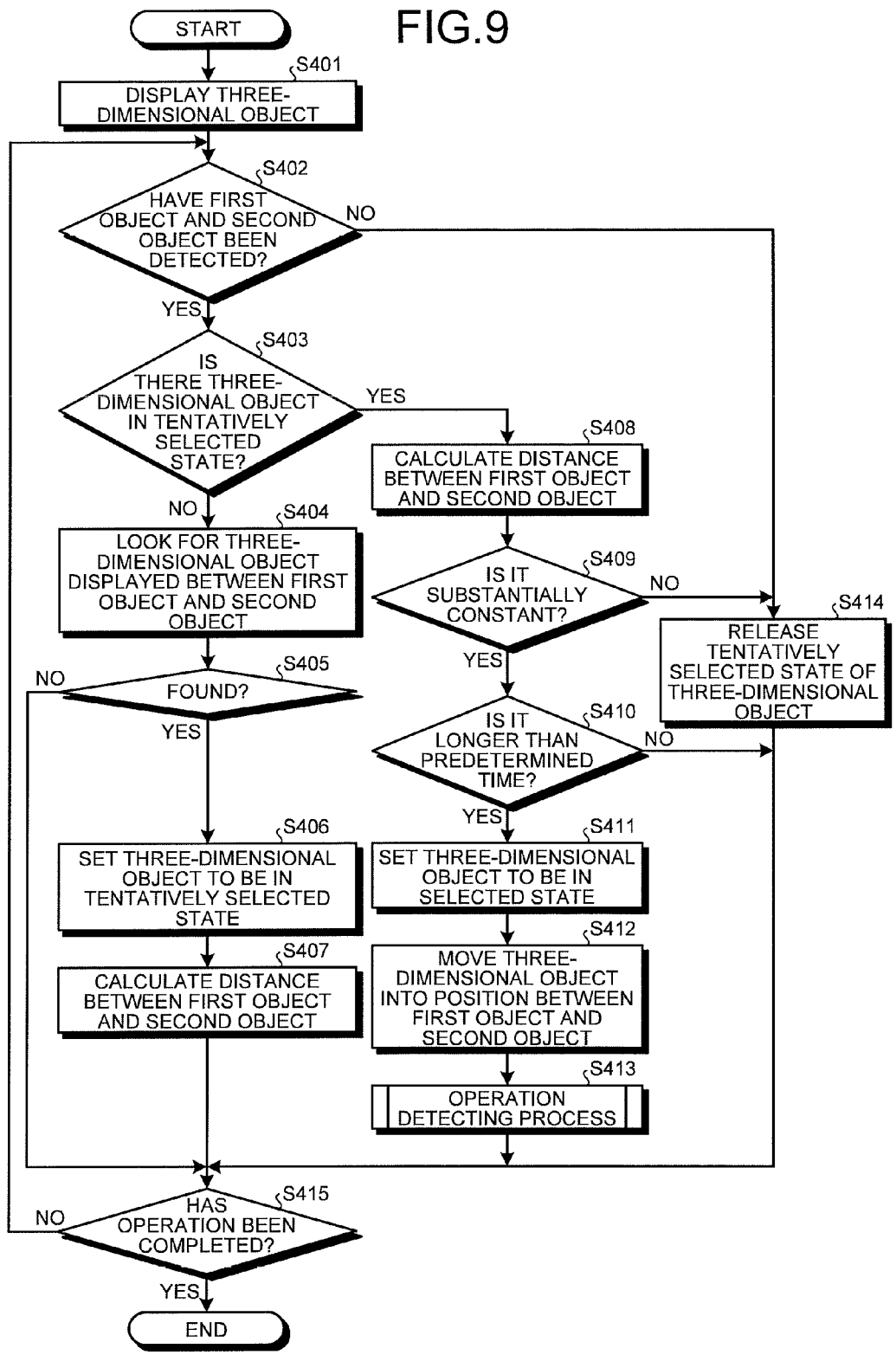
FIG. 9 is a flowchart of a procedure of the selection detecting process.

Then, a procedure for operations of the three-dimensional object executed by the mobile phone 1 will be explained below with reference to FIG. 9. FIG. 9 is a flowchart of the procedure of the selection detecting process for the three-dimensional object. The procedure illustrated in FIG. 9 is implemented by the control unit 22 executing the control program 24a triggered by detection of a predetermined operation or the like.

As illustrated in FIG. 9, first of all, at Step S401, the control unit 22 stereoscopically displays the three-dimensional object. Subsequently, at Step S402, the control unit 22 determines whether the detecting units, that is, the imaging units 40 and 42 have detected the first object and the second object. When the first object and the second object have not been detected (No at Step S402), then at Step S414, the control unit 22 releases, if there is a three-dimensional object in a tentatively selected state, the tentatively selected state of the three-dimensional object. The tentatively selected state represents a state where it is detected that the three-dimensional object is displayed between the two objects and thereafter it is monitored whether the distance between the two objects is maintained substantially constant.

The control unit 22 determines at Step S415 whether the operation completion has been detected. When the operation completion has been detected (Yes at Step S415), the control unit 22 ends the selection detecting process. When the operation completion has not been detected (No at Step S415), the control unit 22 re-executes Step S402 and the subsequent steps.

When the first object and the second object have been detected (Yes at Step S402), then at Step S403, the control unit 22 determines whether there is a three-dimensional object in the tentatively selected state. When there is no three-dimensional object in the tentatively selected state (No at Step S403), then at Step S404, the control unit 22 looks for a three-dimensional object displayed between the first object and the second object, from among displayed three-dimensional objects.

When the three-dimensional object is not found (No at Step S405), then at Step S415, the control unit 22 determines whether the operation completion has been detected. When the operation completion has been detected (Yes at Step S415), the control unit 22 ends the selection detecting process. When the operation completion has not been detected (No at Step S415), the control unit 22 re-executes Step S402 and the subsequent steps.

When the three-dimensional object displayed between the first object and the second object is found (Yes at Step S405), then at Step S406, the control unit 22 sets the three-dimensional object displayed between the first object and the second object to be in the tentatively selected state. The control unit 22 calculates, at Step S407, a distance between the first object and the second object.

The control unit 22 determines at Step S415 whether the operation completion has been detected. When the operation completion has been detected (Yes at Step S415), the control unit 22 ends the selection detecting process. When the operation completion has not been detected (No at Step S415), the control unit 22 re-executes Step S402 and the subsequent steps.

When the first object and the second object have been detected and there is a three-dimensional object in the tentatively selected state (Yes at Step S403), then at Step S408, the control unit 22 calculates a distance between the first object and the second object. The control unit 22 then determines at Step S409 whether the distance is substantially constant. When the distance is not substantially constant (No at Step S409), then at Step S414, the control unit 22 releases the tentatively selected state of the three-dimensional object in the tentatively selected state.

The control unit 22 determines at Step S415 whether the operation completion has been detected. When the operation completion has been detected (Yes at Step S415), the control unit 22 ends the selection detecting process. When the operation completion has not been detected (No at Step S415), the control unit 22 re-executes Step S402 and the subsequent steps.

When the distance between the first object and the second object is substantially constant (Yes at Step S409), then at Step S410, the control unit 22 determines whether a time during which the distance is maintained substantially constant is longer than a predetermined time. When the time during which the distance is maintained substantially constant is not longer than the predetermined time (No at Step S410), then at Step S415, the control unit 22 determines whether the operation completion has been detected. When the operation completion has been detected (Yes at Step S415), the control unit 22 ends the selection detecting process. When the operation completion has not been detected (No at Step S415), the control unit 22 re-executes Step S402 and the subsequent steps.

When the time during which the distance is maintained substantially constant is longer than the predetermined time (Yes at Step S410), then at Step S411, the control unit 22 sets the three-dimensional object in a tentatively selected state to be in the selected state. At Step S412, the control unit 22 moves the three-dimensional object into position between the first object and the second object. At Step S413, the control unit 22 executes the operation detecting process as illustrated in FIG. 5, and changes, during its execution, the three-dimensional object in the selected state according to the detected operation.

After the end of the operation detecting process, the control unit 22 determines at Step S415 whether the operation completion has been detected. When the operation completion has been detected (Yes at Step S415), the control unit 22 ends the selection detecting process. When the operation completion has not been detected (No at Step S415), the control unit 22 re-executes Step S402 and the subsequent steps.

As explained above, the second embodiment is configured so as to select the three-dimensional object when the three-dimensional object is located between the objects such as the fingers and then the distance between the objects is maintained substantially constant for the longer period of time than the predetermined time. Therefore, the user can quickly start the operation after the selection of the three-dimensional object.

Figure 10:
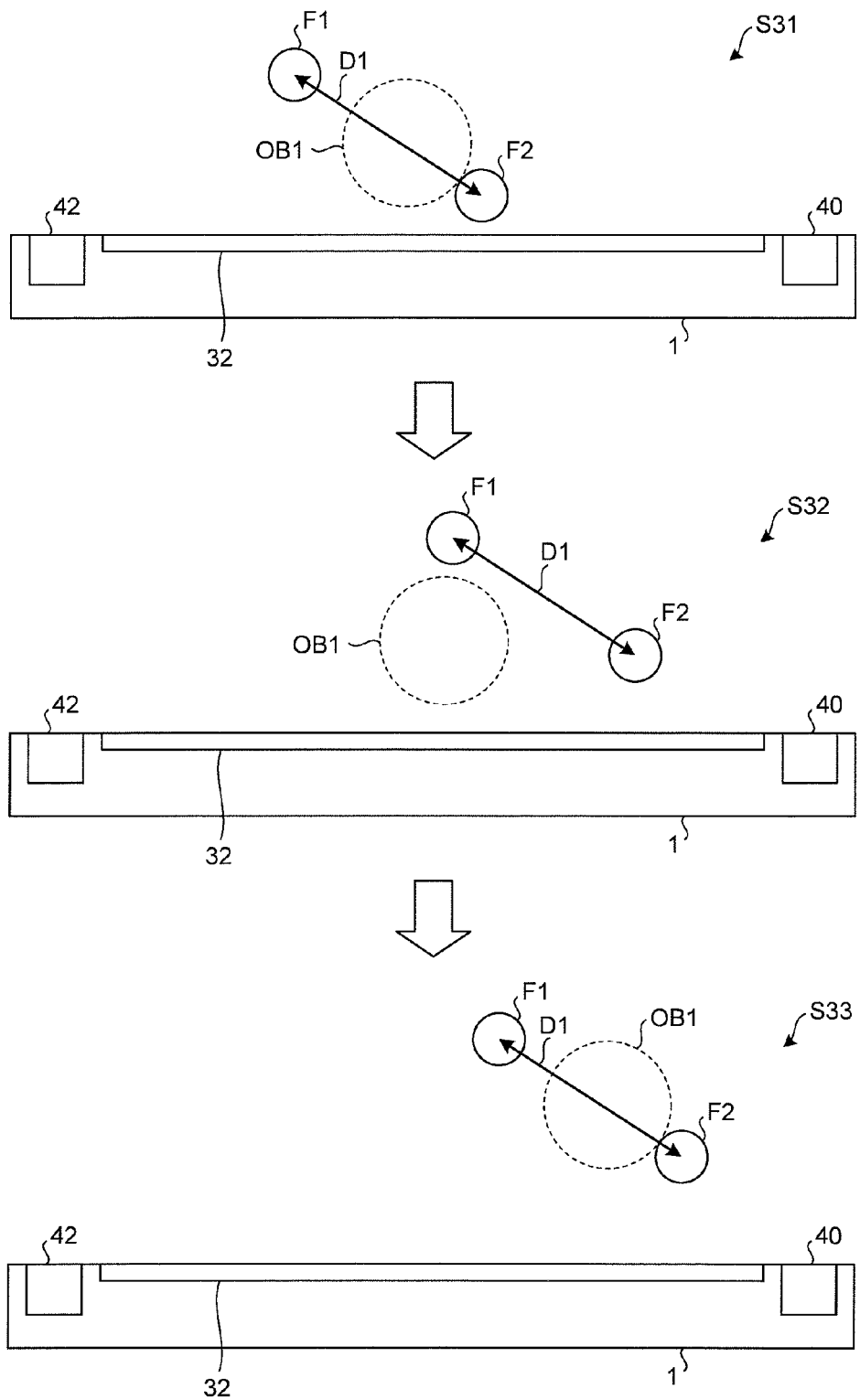
FIG. 10 is a diagram for explaining another example of how to detect an operation performed for the three-dimensional object.

As illustrated at Step S31 to Step S33 in FIG. 10, a state, in which at least one of the first object and the second object is brought into contact with the three-dimensional object and then the distance between the first object and the second object is maintained substantially constant for the longer period of time than the predetermined time, may be set as the condition for selecting the three-dimensional object. If a plurality of three-dimensional objects are closely displayed, by setting the contact with the three-dimensional object as the condition for the selection, the user can easily select a desired three-dimensional object.

Figure 11:
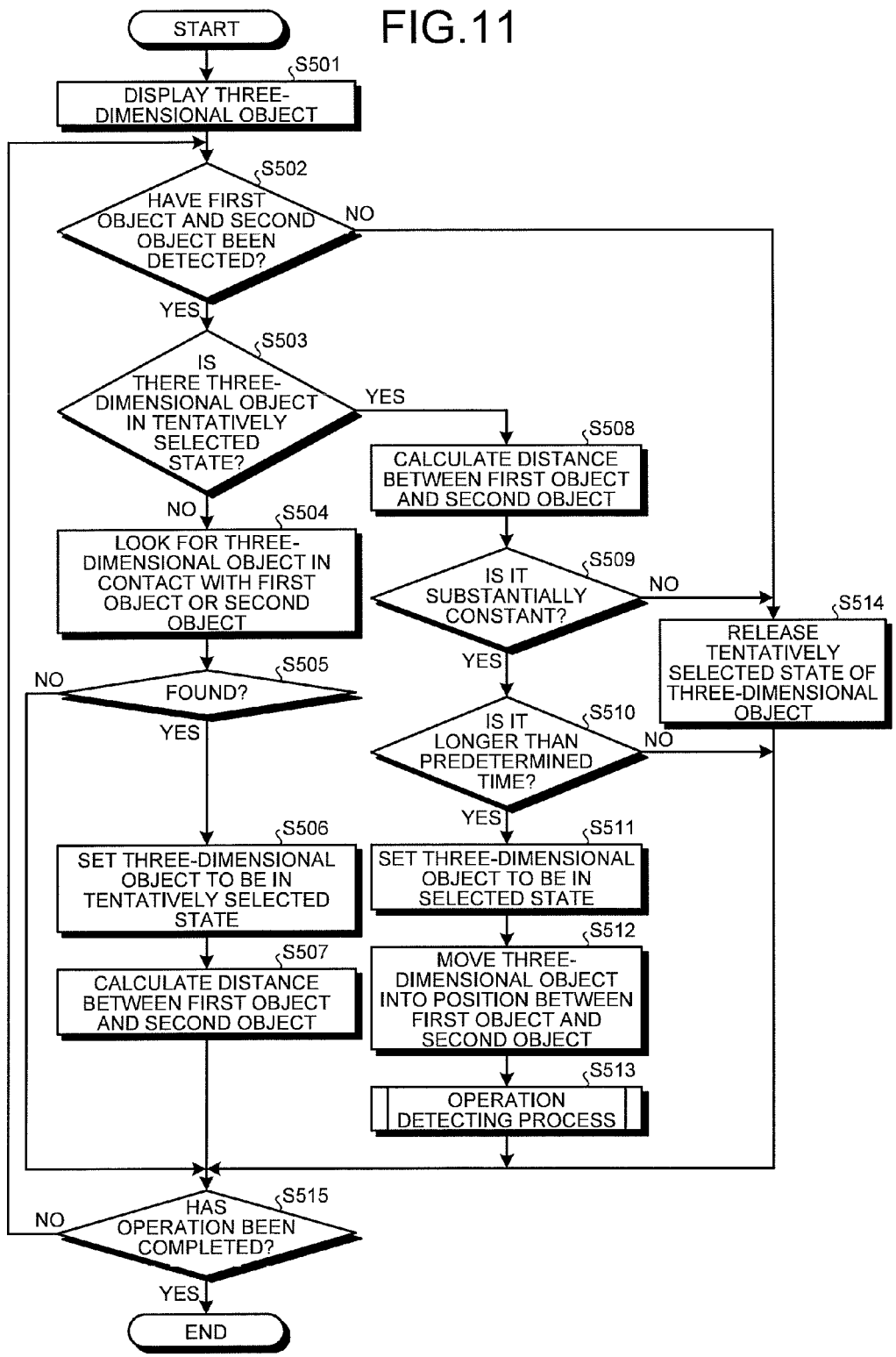
FIG. 11 is a flowchart of a procedure of the selection detecting process when a contact with the three-dimensional object is set as a condition for selection.

FIG. 11 is a flowchart of a procedure of the selection detecting process when a contact with the three-dimensional object is set as a condition for selection. As illustrated in FIG. 11, first of all, at Step S501, the control unit 22 stereoscopically displays the three-dimensional object. Subsequently, at Step S502, the control unit 22 determines whether the detecting units, that is, the imaging units 40 and 42 have detected the first object and the second object. When the first object and the second object have not been detected (No at Step S502), then at Step S514, the control unit 22 releases, if there is a three-dimensional object in a tentatively selected state, the tentatively selected state of the three-dimensional object. The tentatively selected state represents the state where it is detected that at least of two of objects comes in contact with the three-dimensional object and thereafter it is monitored whether the distance between the two objects is maintained substantially constant.

The control unit 22 determines at Step S515 whether the operation completion has been detected. When the operation completion has been detected (Yes at Step S515), the control unit 22 ends the selection detecting process. When the operation completion has not been detected (No at Step S515), the control unit 22 re-executes Step S502 and the subsequent steps.

When the first object and the second object have been detected (Yes at Step S502), then at Step S503, the control unit 22 determines whether there is a three-dimensional object in the tentatively selected state. When there is no three-dimensional object in the tentatively selected state (No at Step S503), then at Step S504, the control unit 22 looks for a three-dimensional object in contact with at least one of the first object and the second object, from among displayed three-dimensional objects.

When the three-dimensional object is not found (No at Step S505), then at Step S515, the control unit 22 determines whether the operation completion has been detected. When the operation completion has been detected (Yes at Step S515), the control unit 22 ends the selection detecting process. When the operation completion has not been detected (No at Step S515), the control unit 22 re-executes Step S502 and the subsequent steps.

When the three-dimensional object in contact with at least one of the first object and the second object is found (Yes at Step S505), then at Step S506, the control unit 22 sets the three-dimensional object displayed between the first object and the second object to be in the tentatively selected state. The control unit 22 calculates, at Step S507, a distance between the first object and the second object.

The control unit 22 determines at Step S515 whether the operation completion has been detected. When the operation completion has been detected (Yes at Step S515), the control unit 22 ends the selection detecting process. When the operation completion has not been detected (No at Step S515), the control unit 22 re-executes Step S502 and the subsequent steps.

When the first object and the second object have been detected and there is a three-dimensional object in the tentatively selected state (Yes at Step S503), then at Step S508, the control unit 22 calculates a distance between the first object and the second object. The control unit 22 then determines at Step S509 whether the distance is substantially constant. When the distance is not substantially constant (No at Step S509), then at Step S514, the control unit 22 releases the tentatively selected state of the three-dimensional object in the tentatively selected state.

The control unit 22 determines at Step S515 whether the operation completion has been detected. When the operation completion has been detected (Yes at Step S515), the control unit 22 ends the selection detecting process. When the operation completion has not been detected (No at Step S515), the control unit 22 re-executes Step S502 and the subsequent steps.

When the distance between the first object and the second object is substantially constant (Yes at Step S509), then at Step S510, the control unit 22 determines whether a time during which the distance is maintained substantially constant is longer than a predetermined time. When the time during which the distance is maintained substantially constant is not longer than the predetermined time (No at Step S510), then at Step S515, the control unit 22 determines whether the operation completion has been detected. When the operation completion has been detected (Yes at Step S515), the control unit 22 ends the selection detecting process. When the operation completion has not been detected (No at Step S515), the control unit 22 re-executes Step S502 and the subsequent steps.

When the time during which the distance is maintained substantially constant is longer than the predetermined time (Yes at Step S510), then at Step S511, the control unit 22 sets the three-dimensional object in a tentatively selected state to be in the selected state. At Step S512, the control unit 22 moves the three-dimensional object into position between the first object and the second object. At Step S513, the control unit 22 executes the operation detecting process as illustrated in FIG. 5, and changes, during its execution, the three-dimensional object in the selected state according to the detected operation.

After the end of the operation detecting process, the control unit 22 determines at Step S515 whether the operation completion has been detected. When the operation completion has been detected (Yes at Step S515), the control unit 22 ends the selection detecting process. When the operation completion has not been detected (No at Step S515), the control unit 22 re-executes Step S502 and the subsequent steps.

A third embodiment will be explained below. The mobile phone 1 according to the third embodiment is different in procedures of the selection detecting process and the operation detecting process executed based on the functions provided by the control program 24a from these according to the first embodiment; however, in terms of the hardware, it is configured in the same manner as that of the mobile phone 1 according to the first embodiment. Therefore, in the third embodiment, explanation that overlaps with the explanation in the first embodiment may be omitted, and the selection detecting process and the operation detecting process will be mainly explained below.

Figure 12:
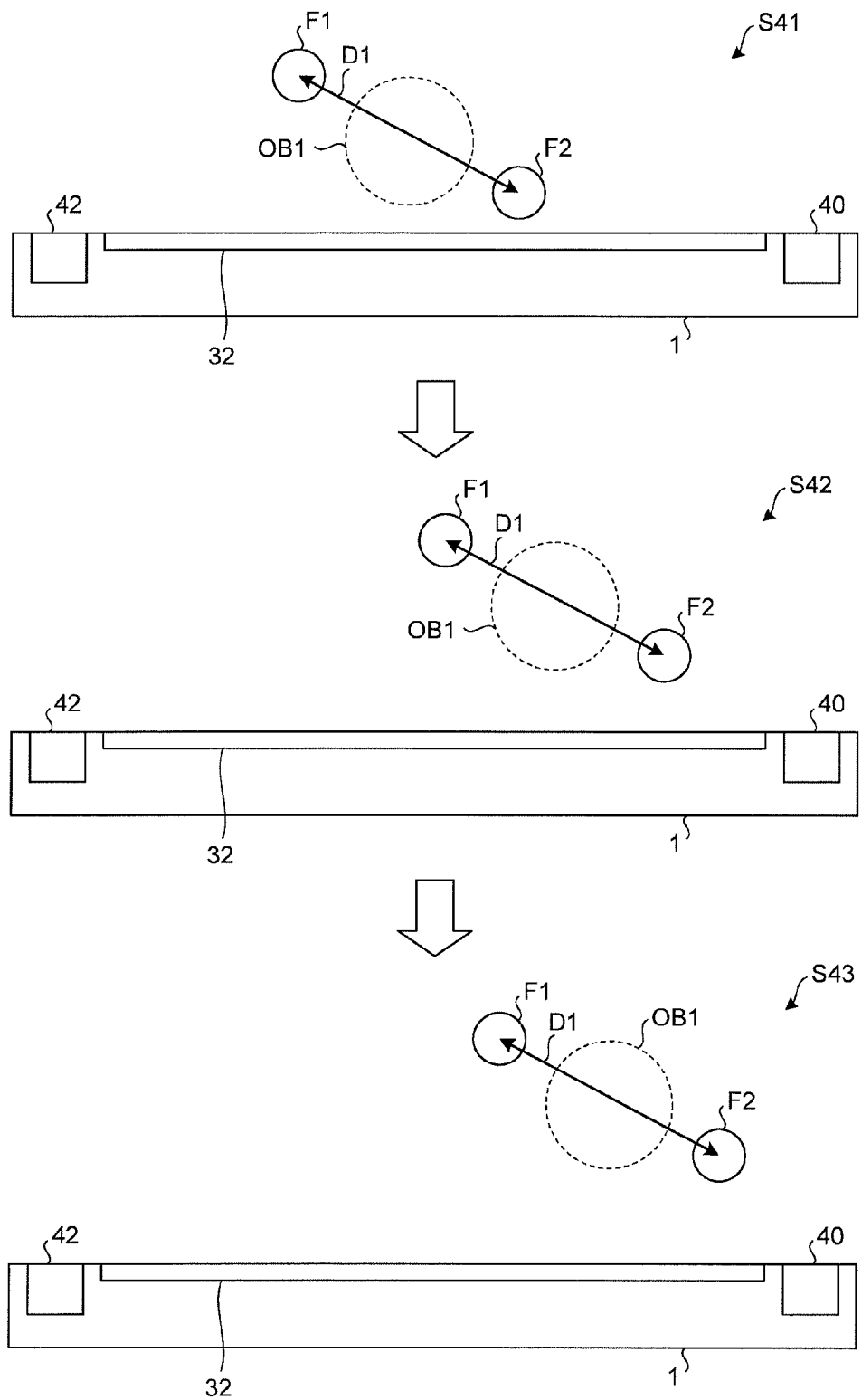
FIG. 12 is a diagram for explaining how to detect an operation performed for the three-dimensional object according to a third embodiment.
Figure 13:
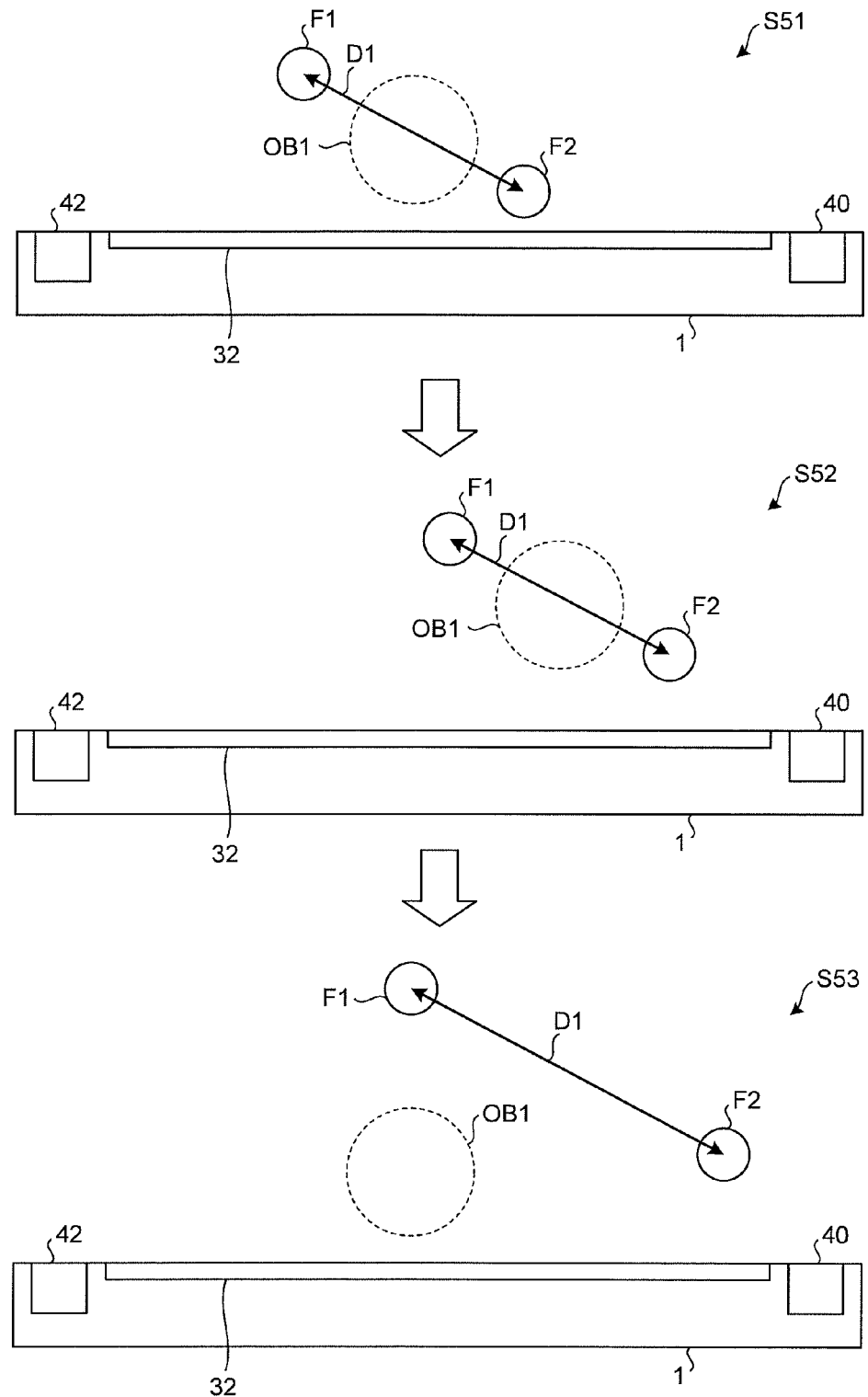
FIG. 13 is a diagram for explaining how to detect an operation performed for the three-dimensional object according to the third embodiment.

First of all, the detection of an operation performed for a three-dimensional object will be explained with reference to FIG. 12 and FIG. 13. FIG. 12 and FIG. 13 are diagrams for explaining how to detect an operation performed for the three-dimensional object. At Step S41 illustrated in FIG. 12, the touch panel 32 stereoscopically displays the three-dimensional object OB1 in the three-dimensional space. To select the three-dimensional object OB1, the user moves the finger F1 and the finger F2 so that the three-dimensional object OB1 is located between the finger F1 and the finger F2.

When the two objects are detected within the three-dimensional space and the three-dimensional object OB1 is located between the two objects, the mobile phone 1 monitors a change in a distance between the two objects. When the distance is substantially constant for the longer period of time than the predetermined time, the mobile phone 1 determines that the three-dimensional object OB1 is selected, and sets the three-dimensional object OB1 to be in the selected state. The mobile phone 1 changes, or so, the display mode of the three-dimensional object OB1 to notify the user that the three-dimensional object OB1 is in the selected state.

There is no need for the two objects to remain in locations where the three-dimensional object OB1 is sandwiched therebetween while the mobile phone 1 monitors the change in the distance between the two objects. That is, the user moves the finger F1 and the finger F2 so that the three-dimensional object OB1 is located between the finger F1 and the finger F2 as illustrated at Step S41, and thereafter the user may move the finger F1 and the finger F2 to some other locations without maintaining the state.

It is assumed, as illustrated at Step S42, that the user moves the finger F1 and the finger F2 from the state of Step S41 while the distance D1 between the finger F1 and the finger F2 is maintained substantially constant. In this case, the mobile phone 1 adds a change such as movement, deformation, or deletion to the three-dimensional object OB1 according to the movements of the finger F1 and the finger F2 from the stage when it is detected that the three-dimensional object OB1 is displayed between the finger F1 and the finger F2, that is, from the stage of Step S41. As illustrated at Step S43, the mobile phone 1 sets the three-dimensional object OB1 to be in the selected state at the stage when the state in which the distance D1 between the finger F1 and the finger F2 is maintained substantially constant continues for the longer period of time than the predetermined time.

As illustrated at Step S51 to Step S53 in FIG. 13, when the distance D1 between the first object and the second object is widened, that is, when the selection is not performed before the predetermined time elapses, the mobile phone 1 adds a reverse change to the change applied so far, to the three-dimensional object OB1. Consequently, the three-dimensional object OB1 is displayed at the same position as that at the stage of Step S51 in the same state. The speed of the reverse change added to the three-dimensional object OB1 may be higher than the speed at which the change is added to the three-dimensional object OB1 so far. That is, the three-dimensional object OB1 may be reversely changed as if it is reversely reproduced at a high speed.

In this way, by starting adding the change to the three-dimensional object from the stage when it is detected that the three-dimensional object is displayed between the two objects, the user can recognize that the three-dimensional object is being selected before the selection is determined. As a result, the user is able to know, at an early point, whether an intended three-dimensional object is selected. Until the state in which the distance between the two objects is maintained substantially constant continues for the longer period of time than the predetermined time, the three-dimensional object with the change added thereto may be displayed in a mode (e.g., translucent mode) different from the normal mode or from the mode in the selected state, so that the user can easily determine the state of the three-dimensional object.

Figure 14:
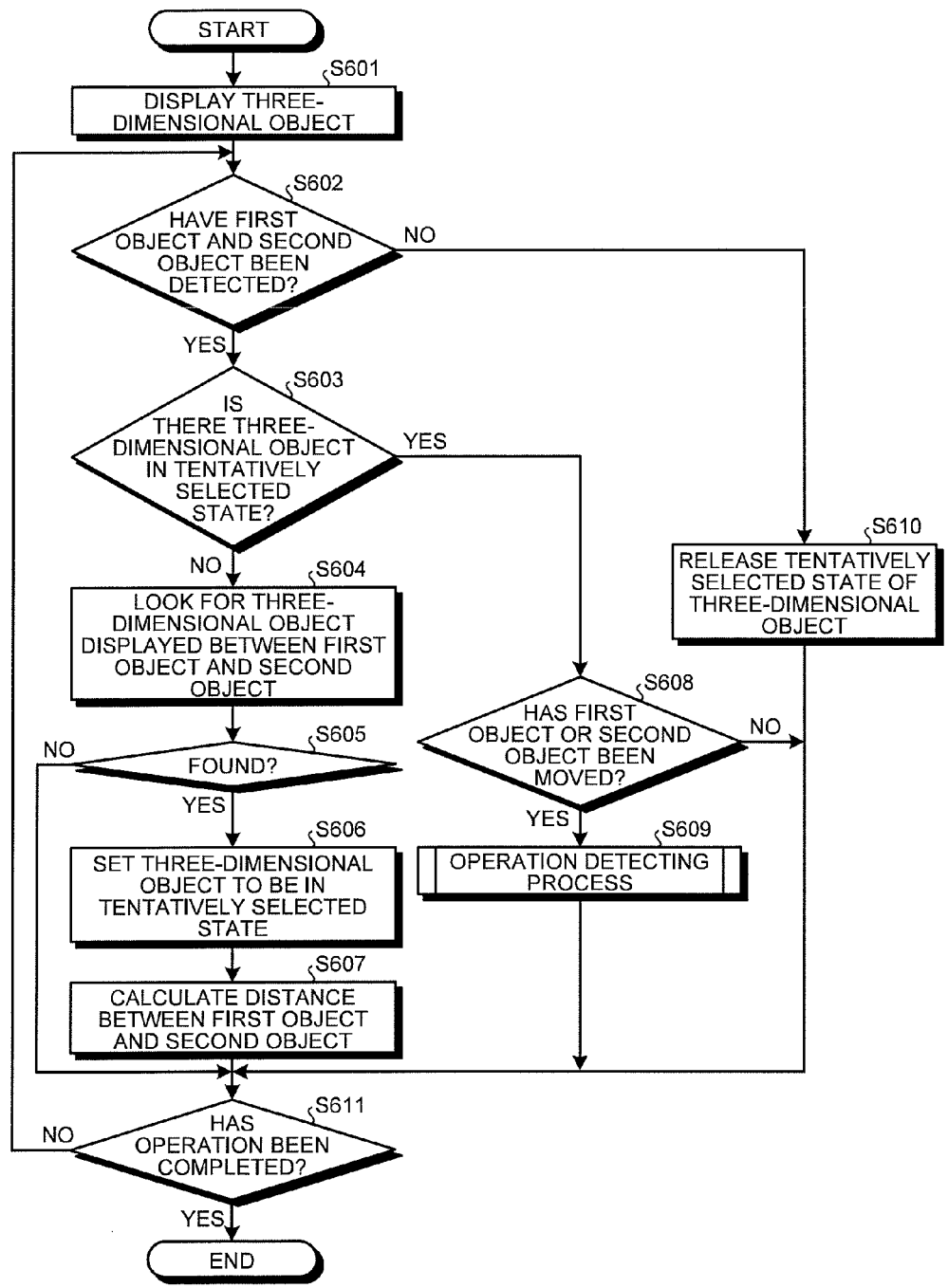
FIG. 14 is a flowchart of a procedure of the selection detecting process.

Then, a procedure for operations of the three-dimensional object executed by the mobile phone 1 will be explained below with reference to FIG. 14 and FIG. 15. FIG. 14 is a flowchart of the procedure of the selection detecting process for the three-dimensional object. The procedure illustrated in FIG. 14 is implemented by the control unit 22 executing the control program 24a triggered by detection of a predetermined operation or the like.

As illustrated in FIG. 14, first of all, at Step S601, the control unit 22 stereoscopically displays the three-dimensional object. Subsequently, at Step S602, the control unit 22 determines whether the detecting units, that is, the imaging units 40 and 42 have detected the first object and the second object. When the first object and the second object have not been detected (No at Step S602), then at Step S610, the control unit 22 releases, if there is a three-dimensional object in the tentatively selected state, the tentatively selected state of the three-dimensional object.

The control unit 22 determines at Step S611 whether the operation completion has been detected. When the operation completion has been detected (Yes at Step S611), the control unit 22 ends the selection detecting process. When the operation completion has not been detected (No at Step S611), the control unit 22 re-executes Step S602 and the subsequent steps.

When the first object and the second object have been detected (Yes at Step S602), then at Step S603, the control unit 22 determines whether there is a three-dimensional object in the tentatively selected state. When there is no three-dimensional object in the tentatively selected state (No at Step S603), then at Step S604, the control unit 22 looks for a three-dimensional object displayed between the first object and the second object, from among displayed three-dimensional objects.

When the three-dimensional object is not found (No at Step S605), then at Step S611, the control unit 22 determines whether the operation completion has been detected. When the operation completion has been detected (Yes at Step S611), the control unit 22 ends the selection detecting process. When the operation completion has not been detected (No at Step S611), the control unit 22 re-executes Step S602 and the subsequent steps.

When the three-dimensional object displayed between the first object and the second object is found (Yes at Step S605), then at Step S606, the control unit 22 sets the three-dimensional object displayed between the first object and the second object to be in the tentatively selected state. The control unit 22 calculates, at Step S607, a distance between the first object and the second object.

The control unit 22 determines at Step S611 whether the operation completion has been detected. When the operation completion has been detected (Yes at Step S611), the control unit 22 ends the selection detecting process. When the operation completion has not been detected (No at Step S611), the control unit 22 re-executes Step S602 and the subsequent steps.

When the first object and the second object have been detected and there is a three-dimensional object in the tentatively selected state (Yes at Step S603), then at Step S608, the control unit 22 determines whether at least one of the first object and the second object has been moved. When neither of the first object and the second object has been moved (No at Step S608), then at Step S611, the control unit 22 determines whether the operation completion has been detected. When the operation completion has been detected (Yes at Step S611), the control unit 22 ends the selection detecting process. When the operation completion has not been detected (No at Step S611), the control unit 22 re-executes Step S602 and the subsequent steps.

Figure 15:
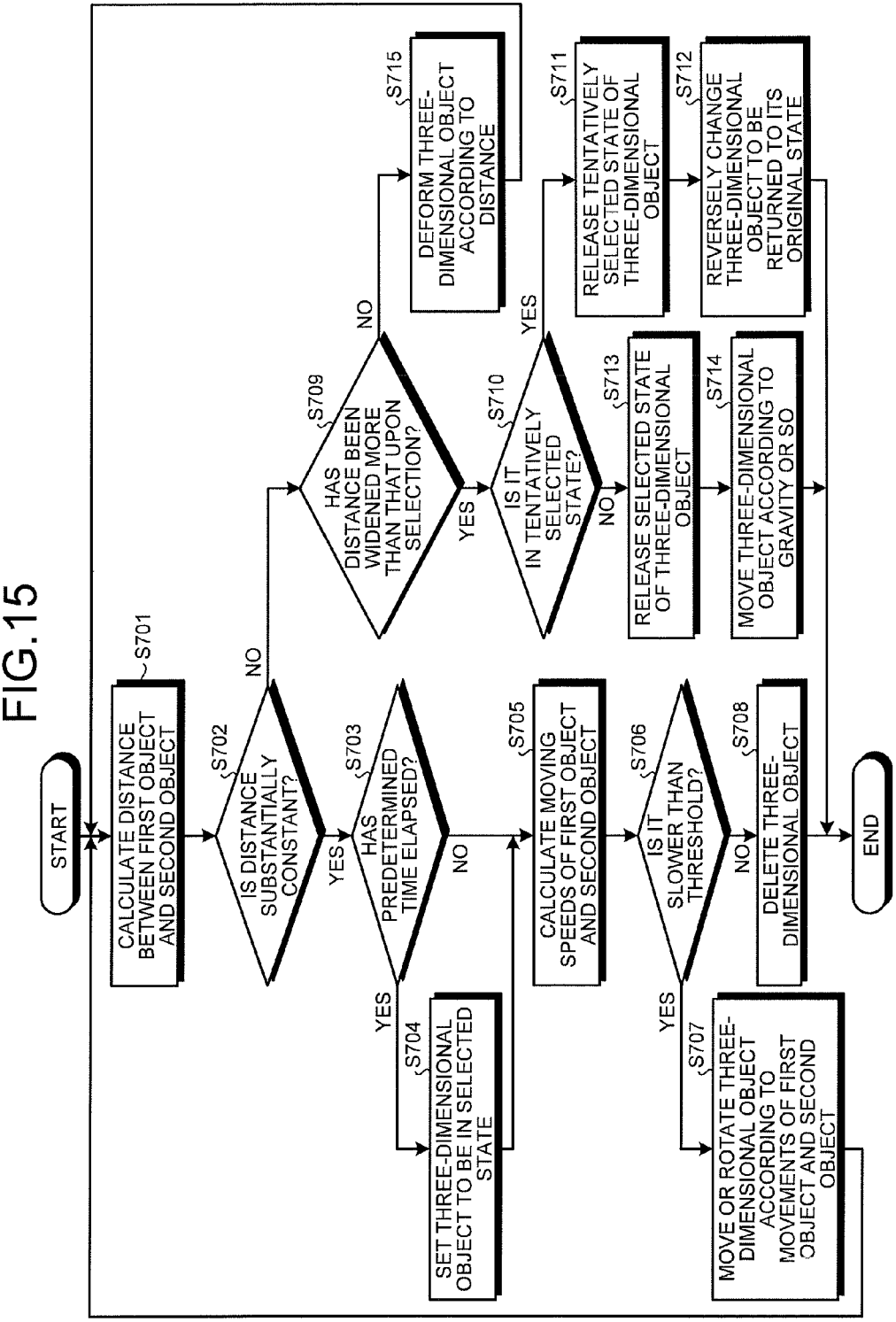
FIG. 15 is a flowchart of a procedure of the operation detecting process.

When at least one of the first object and the second object has been moved (Yes at Step S608), then at Step S609, the control unit 22 executes the operation detecting process illustrated in FIG. 15, and changes, during its execution, the three-dimensional object in the selected state according to the detected operation.

After the end of the operation detecting process, the control unit 22 determines at Step S611 whether the operation completion has been detected. When the operation completion has been detected (Yes at Step S611), the control unit 22 ends the selection detecting process. When the operation completion has not been detected (No at Step S611), the control unit 22 re-executes Step S602 and the subsequent steps.

FIG. 15 is a flowchart of a procedure of the operation detecting process. The procedure illustrated in FIG. 15 is implemented by the control unit 22 executing the control program 24a. As illustrated in FIG. 15, first of all, at Step S701, the control unit 22 calculates a distance between the first object and the second object. Then at Step S702, the control unit 22 determines whether the distance between the first object and the second object after the start of the operation detecting process is substantially constant.

When the distance between the first object and the second object is substantially constant (Yes at Step S702), then at Step S703, the control unit 22 determines whether a predetermined time has elapsed since the start of the operation detecting process. When the predetermined time has elapsed (Yes at Step S703), then at Step S704, the control unit 22 sets, if there is a three-dimensional object in the tentatively selected state, the three-dimensional object to be in the selected state. When the predetermined time has not elapsed (No at Step S703), the control unit 22 does not execute Step S704.

Subsequently, at Step S705, the control unit 22 calculates moving speeds of the first object and the second object. The control unit 22 determines at Step S706 whether each of the calculated moving speeds is slower than a threshold. When the moving speed is slower than the threshold (Yes at Step S706), then at Step S707, the control unit 22 moves or rotates the three-dimensional object according to the movements of the detected first object and second object. The control unit 22 then re-executes Step S701 and the subsequent steps.

When the moving speed is higher than the threshold (No at Step S706), then at Step S708, the control unit 22 deletes the three-dimensional object. When the three-dimensional object is to be deleted, an animation may be displayed as if the three-dimensional object flies toward a moving direction of the first object and the second object. The control unit 22 then ends the operation detecting process. Instead of the operation for moving the first object and the second object at a high speed, for example, deletion of the three-dimensional object may be assigned to an operation of crushing the three-dimensional object. Instead of deleting the three-dimensional object, the three-dimensional object may be returned to its initial location.

When the distance between the first object and the second object is not substantially constant (No at Step S702), then at Step S709, the control unit 22 determines whether the distance has been widened more than that upon selection of the three-dimensional object, that is, upon start of the operation detecting process. When the distance has been widened (Yes at Step S709), then at Step S710, the control unit 22 determines whether the three-dimensional object displayed between the first object and the second object is in the tentatively selected state.

When the three-dimensional object is in the tentatively selected state (Yes at Step S710), then at Step S711, the control unit 22 releases the tentatively selected state of the three-dimensional object. At Step S712, the control unit 22 reversely changes the three-dimensional object to be returned to its original state. The control unit 22 then ends the operation detecting process.

When the three-dimensional object is not in the tentatively selected state, that is, is in the selected state (No at Step S710), then at Step S713, the control unit 22 releases the selected state of the three-dimensional object. At Step S714, the control unit 22 moves the three-dimensional object, whose selected state has been released, according to gravity or so. The control unit 22 then ends the operation detecting process. The movement in this case is displayed in such a manner that the three-dimensional object falls according to gravity and stops on a floor or a table. Before the movement of the three-dimensional object is stopped, the three-dimensional object may be bounded according to the elasticity of the three-dimensional object and/or according to the hardness of the floor or the table. The magnitude of impact produced when the three-dimensional object strikes the floor or the table may be calculated, and if the impact is greater than a predetermined value, then the three-dimensional object may be displayed as if it is broken. The three-dimensional object may be moved more slowly than a case where actual gravity works.

When the distance between the first object and the second object has been reduced more than that upon selection of the three-dimensional object (No at Step S709), then at Step S715, the control unit 22 deforms the three-dimensional object according to the distance. The control unit 22 then re-executes Step S701 and the subsequent steps. The degree of deformation of the three-dimensional object may be changed according to, for example, the hardness set as an attribute of the three-dimensional object.

As explained above, the third embodiment is configured to change the three-dimensional object according to the operation from the time when it is detected that the three-dimensional object is located between the objects such as the fingers, and therefore the user can easily recognize the selection of the three-dimensional object.

Figure 16:
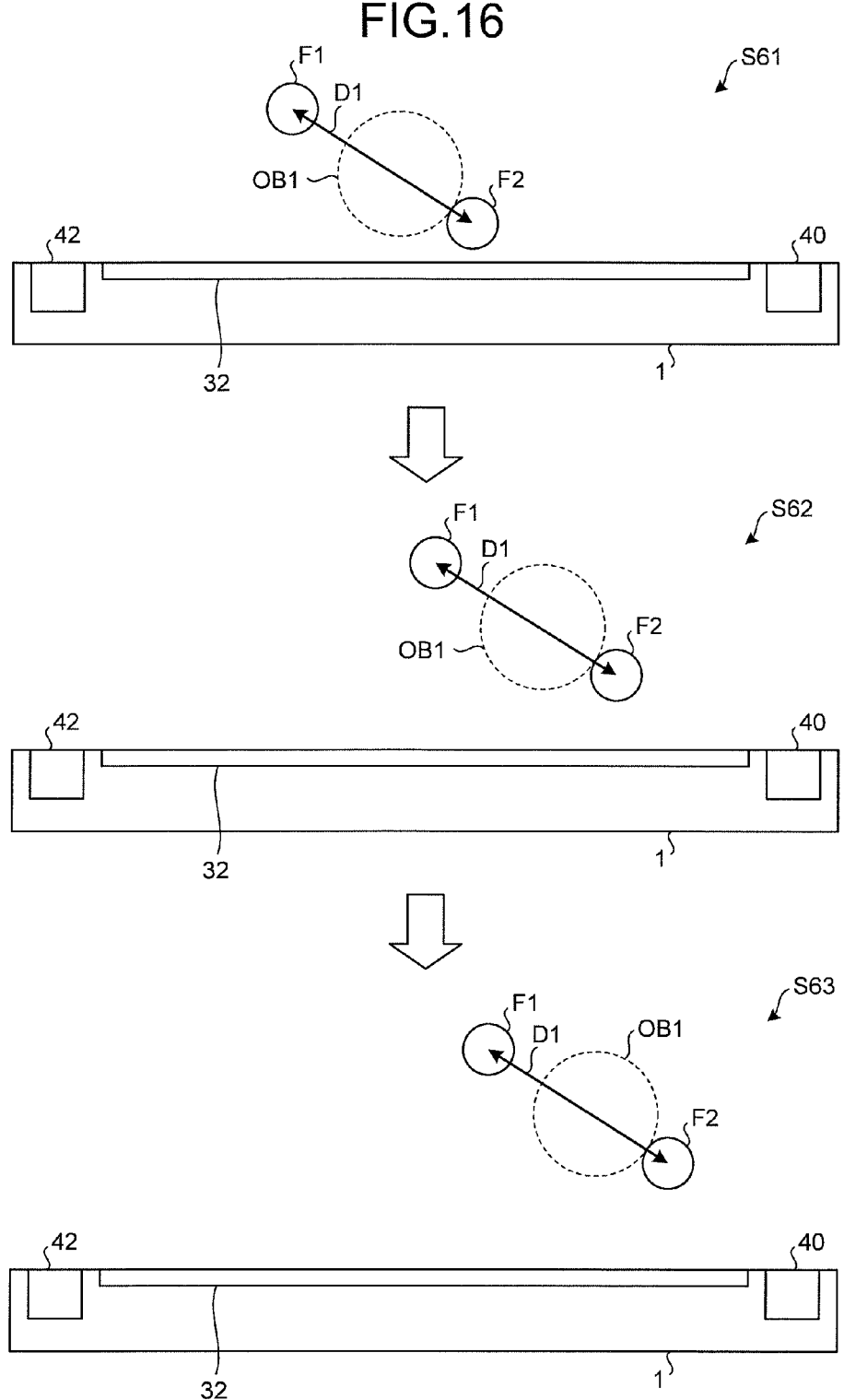
FIG. 16 is a diagram for explaining another example of how to detect an operation performed for the three-dimensional object.

As illustrated at Step S61 to Step S63 in FIG. 16, a state, in which at least one of the first object and the second object is brought into contact with the three-dimensional object and then the distance between the first object and the second object is maintained substantially constant for the longer period of time than the predetermined time, may be set as the condition for selecting the three-dimensional object. If a plurality of three-dimensional objects are closely displayed, by setting the contact with the three-dimensional object as the condition for the selection, the user can easily select a desired three-dimensional object.

Figure 17:
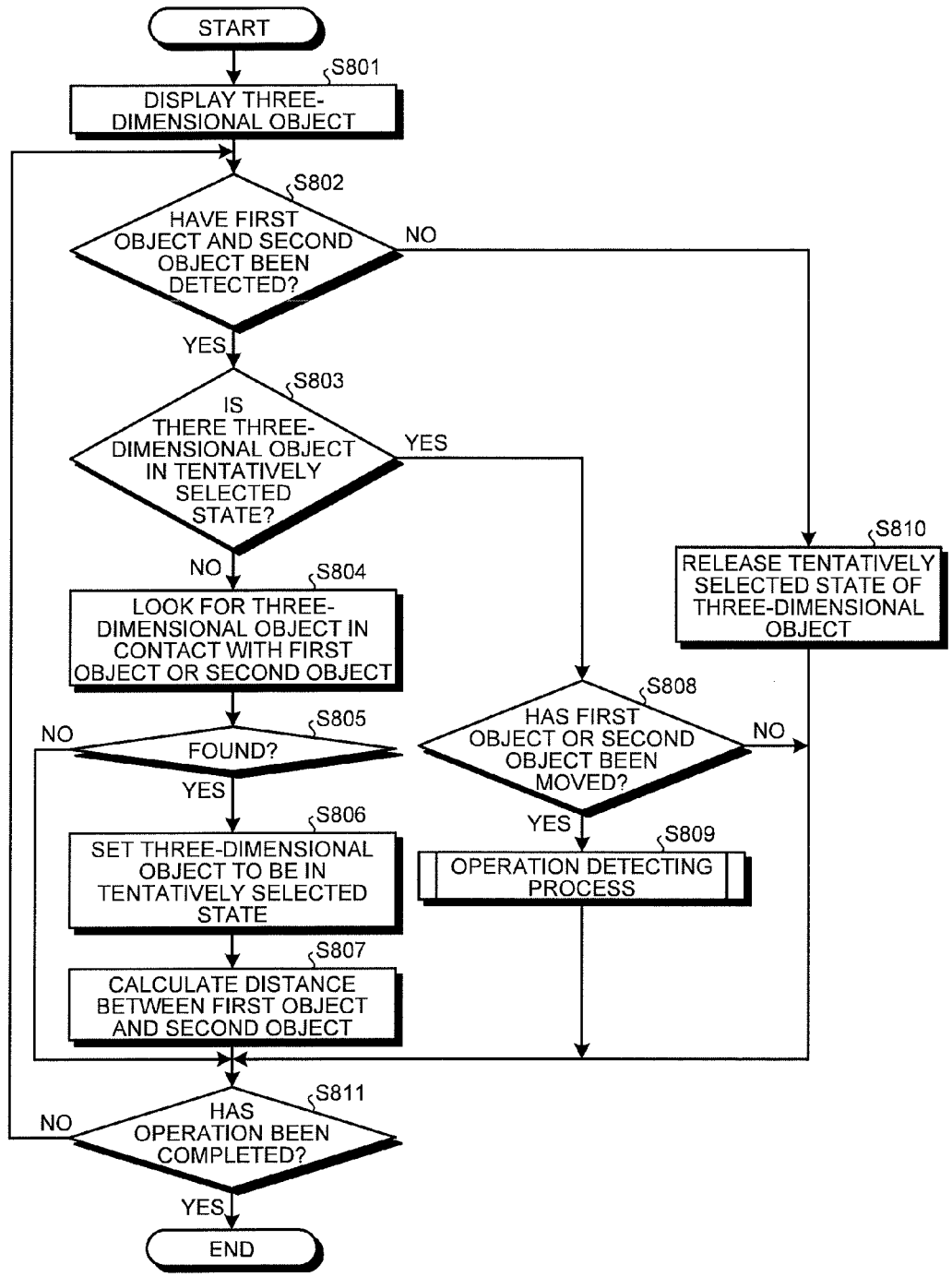
FIG. 17 is a flowchart of a procedure of the selection detecting process when a contact with the three-dimensional object is set as a condition for selection.

FIG. 17 is a flowchart of a procedure of the selection detecting process when a contact with the three-dimensional object is set as a condition for selection. As illustrated in FIG. 17, first of all, at Step S801, the control unit 22 stereoscopically displays the three-dimensional object. Subsequently, at Step S802, the control unit 22 determines whether the detecting units, that is, the imaging units 40 and 42 have detected the first object and the second object. When the first object and the second object have not been detected (No at Step S802), then at Step S810, the control unit 22 releases, if there is a three-dimensional object in the tentatively selected state, the tentatively selected state of the three-dimensional object.

The control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected (Yes at Step S802), then at Step S803, the control unit 22 determines whether there is a three-dimensional object in the tentatively selected state. When there is no three-dimensional object in the tentatively selected state (No at Step S803), then at Step S804, the control unit 22 looks for a three-dimensional object in contact with at least one of the first object and the second object, from among displayed three-dimensional objects.

When the three-dimensional object is not found (No at Step S805), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the three-dimensional object in contact with at least one of the first object and the second object is found (Yes at Step S805), then at Step S806, the control unit 22 sets the three-dimensional object displayed between the first object and the second object to be in the tentatively selected state. The control unit 22 calculates, at Step S807, a distance between the first object and the second object.

The control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected and there is a three-dimensional object in the tentatively selected state (Yes at Step S803), then at Step S808, the control unit 22 determines whether at least one of the first object and the second object has been moved. When neither of the first object and the second object has been moved (No at Step S808), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When at least one of the first object and the second object has been moved (Yes at Step S808), then at Step S809, the control unit 22 executes the operation detecting process illustrated in FIG. 15, and changes, during its execution, the three-dimensional object in the selected state according to the detected operation.

After the end of the operation detecting process, the control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

A fourth embodiment will be explained below. The above embodiments are configured to detect the objects that control the three-dimensional object based on the images photographed by the imaging units; however, any other detection units may be used. For example, a capacitive type touch sensor can detect a position of a finger that does not touch the touch sensor by increasing the sensitivity. Therefore, an example of using the touch sensor as a detector that detects objects controlling a three-dimensional object is explained in the fourth embodiment. In the following explanation, the same signs as the already explained components are assigned to the same components as the already explained components. Explanation that overlaps the above explanation may be omitted.

Figure 18:
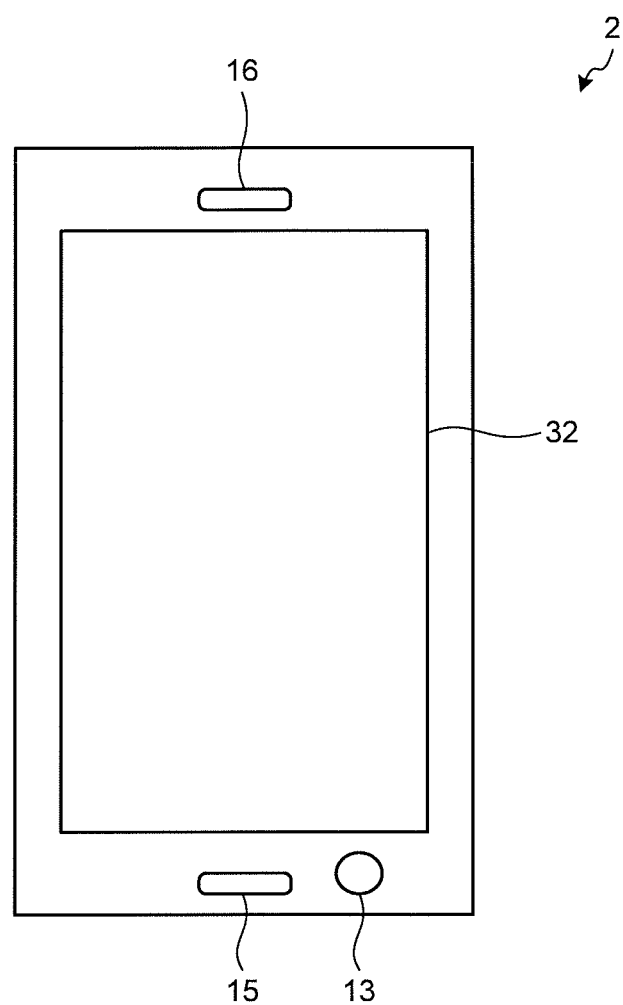
FIG. 18 is a front view of a mobile phone according to a fourth embodiment.
Figure 19:
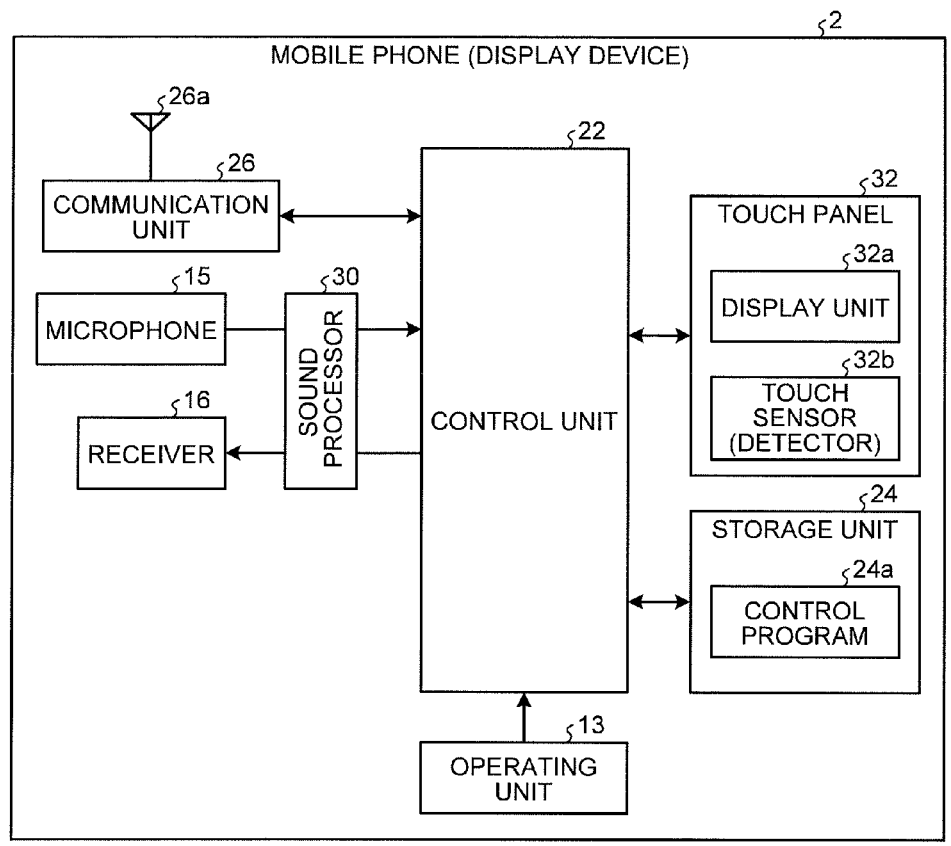
FIG. 19 is a block diagram of the mobile phone according to the fourth embodiment.

First of all, a configuration of a mobile phone (display device) 2 according to the fourth embodiment will be explained below with reference to FIG. 18 and FIG. 19. FIG. 18 is a front view of the mobile phone 2. FIG. 19 is a block diagram of the mobile phone 2.

As illustrated in FIG. 18 and FIG. 19, the mobile phone 2 includes the operating unit 13, the microphone 15, the receiver 16, the control unit 22, the storage unit 24, the communication unit 26, the sound processor 30, and the touch panel 32.

The touch panel 32 displays various pieces of information such as characters, graphics, and images, and detects an input operation performed on a predetermined display area such as icon, button, and character input area. The touch panel 32 is structured with the display unit 32a and the touch sensor 32b so as to overlap each other. The touch sensor 32b according to the present embodiment is a capacitive type touch sensor. The touch sensor 32b functions also as a detector that detects fingers operating a three-dimensional object.

Figure 20:
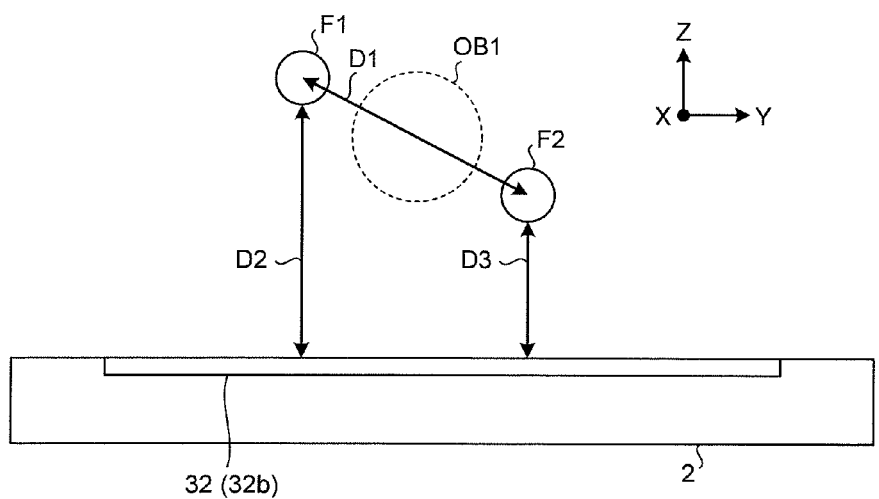
FIG. 20 is a diagram for explaining how to detect an operation performed for the three-dimensional object according to the fourth embodiment.

Then, the detection of an operation performed for a three-dimensional object will be explained with reference to FIG. 20. FIG. 20 is a diagram for explaining how to detect an operation performed for a three-dimensional object. As illustrated in FIG. 20, the touch panel 32 stereoscopically displays the three-dimensional object OB1 in the three-dimensional space.

Here, it is assumed that the user wishes to perform some operation for the three-dimensional object OB1. To perform some operation for the three-dimensional object OB1, first of all, the three-dimensional object OB1 has to be selected as an operation object. To select the three-dimensional object OB1, as illustrated in FIG. 20, the user moves the finger F1 and the finger F2 so that the three-dimensional object OB1 is located between the finger F1 and the finger F2.

The mobile phone 2 detects locations of the finger F1 and the finger F2 using the touch sensor 32b. The touch sensor 32b can detect locations of the finger F1 and the finger F2 in an X-axis direction and a Y-axis direction by increasing its sensitivity even if, for example, a distance between the fingers F1 and F2 and the surface of the touch panel 32 in a Z-axis direction is about 10 cm. The touch sensor 32b can detect a distance D2 of the finger F1 from the surface of the touch panel 32 in the Z-axis direction and detect a distance D3 of the finger F2 from the surface of the touch panel 32 in the Z-axis direction based on the magnitude of the capacitance.

The mobile phone 2 can calculate the distance D1 between the finger F1 and the finger F2 and can determine whether the three-dimensional object is displayed between the finger F1 and the finger F2, based on the thus detected locations of the finger F1 and the finger F2 in the three-dimensional space. The control after it is detected that the three-dimensional object is displayed between the finger F1 and the finger F2 is executed according to the procedure explained in any one of the first embodiment to the third embodiment.

As explained above, the fourth embodiment is configured to use the touch sensor as a detector, so that the operation performed for the three-dimensional object can be detected even by a display device without the imaging unit.

To detect the operation performed for the three-dimensional object, the imaging unit and the touch sensor may be used in combination with each other. When the imaging unit is combined with the touch sensor, respective detection results may be averaged to specify locations of the finger F1 and the finger F2. A weighted average may be used, such that weighting of the detection results of the touch sensor is increased in an area near the touch panel 32 where the imaging unit 40 is difficult to acquire images of the finger F1 and the finger F2 and weighting of the detection results of the imaging unit 40 is increased in an area far from the touch panel 32 where the detection precision of the touch sensor becomes low.

Figure 21:
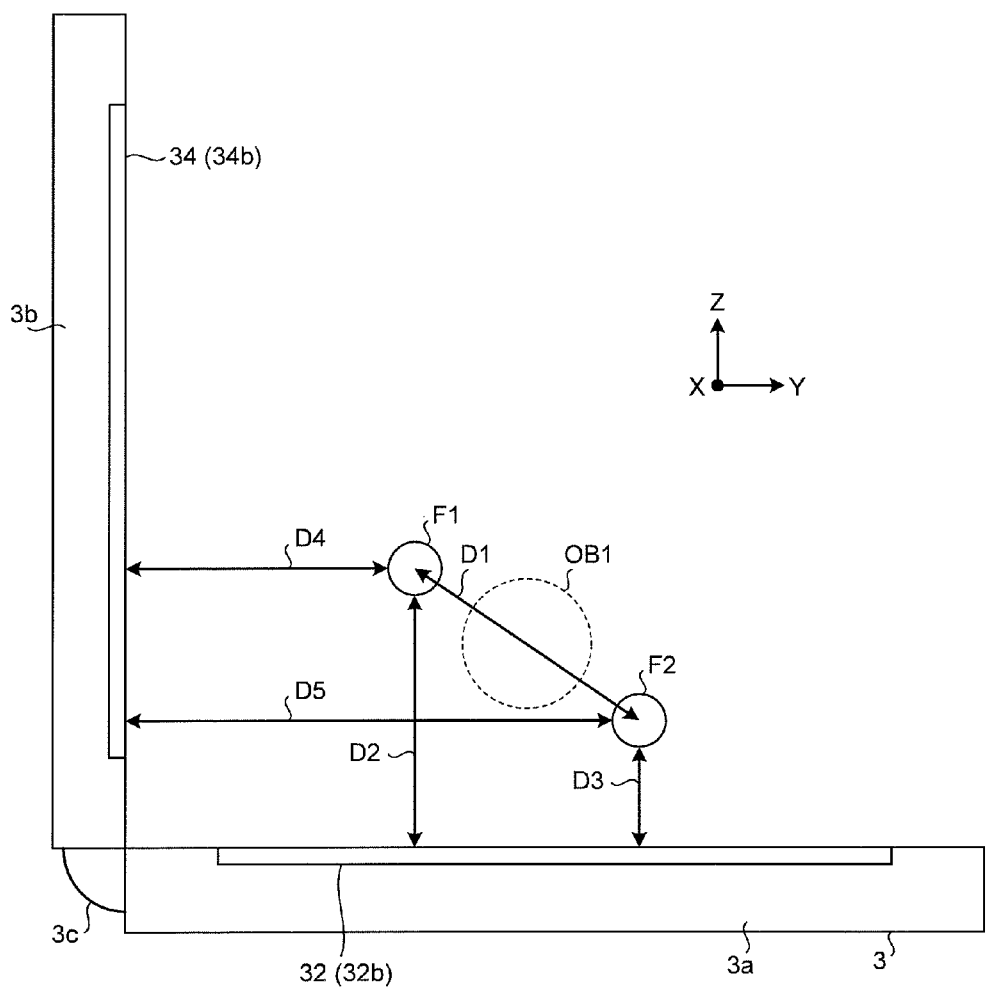
FIG. 21 is a diagram of a modified example of the mobile phone according to the fourth embodiment.

To prevent the touch sensor from not detecting a location of a finger with high precision because the other finger or so may block the finger, a plurality of touch sensors may be used to detect an operation performed for the three-dimensional object. FIG. 21 is a diagram of an example of a mobile phone 3 that uses a plurality of touch sensors to detect an operation performed for the three-dimensional object.

The mobile phone 3 includes a first housing 3a, a second housing 3b, and a hinge 3c. The hinge 3c couples the first housing 3a and the second housing 3b so as to be openable and closable. The first housing 3a is provided with the touch panel 32 including the touch sensor 32b, and the second housing 3b is provided with a touch panel 34 including a touch sensor 34b. As illustrated in FIG. 21, the touch sensor 32b and the touch sensor 34b contact the three-dimensional space at different angles when the first housing 3a and the second housing 3b are coupled to each other at an angle of about 90 degrees.

The touch sensor 32b can detect locations of the finger F1 and the finger F2 in the X-axis direction and the Y-axis direction. The touch sensor 32b can also detect the distance D2 of the finger F1 from the surface of the touch panel 32 in the Z-axis direction and the distance D3 of the finger F2 from the surface of the touch panel 32 in the Z-axis direction, based on the magnitude of the capacitance.

The touch sensor 34b can detect locations of the finger F1 and the finger F2 in the X-axis direction and the Z-axis direction. The touch sensor 34b can also detect a distance D4 of the finger F1 from the surface of the touch panel 34 in the Y-axis direction and a distance D5 of the finger F2 from the surface of the touch panel 34 in the Y-axis direction, based on the magnitude of the capacitance.

In this manner, by detecting the finger F1 and the finger F2 from different directions, even if there is some obstacle, the locations of the finger F1 and the finger F2 can be detected from either one of the directions. When the finger F1 and the finger F2 are to be detected from the different directions, one of the touch panels displays the three-dimensional object, and the other touch panel may stop displaying or may two-dimensionally display guidance or so.

Examples of the application of the display device explained in the embodiments and modified examples thereof will be explained below. A three-dimensional object (display object) being an operation object may be any object resembling an object actually existing such as a book, blocks, a spoon, chopsticks, playing cards, clay, and an instrument, or may be any object not existing such as a virtual avatar, a character in a game, and an augmented reality (AR) tag in virtual reality. The change added to the three-dimensional object according to the detected operation is not limited to the movement, the deformation, the deletion, or the like. The operation detected in the operation detecting process and the change added to the three-dimensional object according to the operation are not limited to the embodiments, and may therefore be changed according to the type of the three-dimensional object.

For example, when a three-dimensional object resembling a book (hereinafter, "book") is determined as an operation object, the book being the operation object is selected by the selection detecting process. The book to be selected may be in its closed state or in its open state. After the book is selected, the display device executes movement of the book, page turning, and the like according to the detected operation, to change the external appearance of the book. A current page number may be displayed somewhere in the three-dimensional space in synchronization with page turning.

When a three-dimensional object resembling playing cards (hereinafter, "cards") is determined as an operation object, the cards being the operation object are selected by the selection detecting process. The number of cards to be selected according to the operation may be controlled in the selection detecting process. For example, when an operation of holding a top card and a bottom card is detected, a whole deck of the cards may be set in the selected state. When an operation of holding cards from the sides is detected, a part of the deck of the cards may be set in the selected state according to the locations of the objects that hold the cards. After the cards are selected, the display device shuffles, or so, the cards according to the detected operation, and changes the external appearance of the cards.

The aspects of the present invention represented in the embodiments can be arbitrarily modified without departing from the spirit of the present invention. Moreover, the embodiments may be combined with each other as required. For example, the control program 24a represented in the embodiments may be divided into a plurality of modules or may be integrated with any other program. In the embodiments, the fingers are used to operate the three-dimensional object; however, a stick-like object or so of which end can be charged with static electricity may be used instead of the fingers.

In the embodiments, the example of using the imaging units and the touch sensor are used as a detector in order to detect the three-dimensional object; however, the detector is not limited thereto. For example, a sensor using a Time-of-Flight (TOF) method may be used instead of the imaging unit. When a plurality of proximity sensor or the like capable of detecting a movement of the three-dimensional object in a planar direction of the three-dimensional space are arranged substantially horizontally with respect to a moving direction of the object, displacement of the object can be detected even in a noncontact manner, and therefore these devices may also be used. It is preferable that the displacement of the object can be detected without providing the sensor or the like in the object. If the sensor or the like is not provided in the object, then this does not have to attach an acceleration sensor to the finger or does not have to move a display device itself with an acceleration sensor, which leads to cost reduction.

The embodiments have explained the case where the three-dimensional object projects toward the user side; however, the present invention is also applicable to a case of representing the three-dimensional object as if it is present in a deeper side than the display unit. In this case, a sensor and a camera may be provided in the back side of the display unit. When the display device is a mobile phone, many mobile phones are provided with an in-camera for photographing the user himself/herself and an out-camera for photographing landscapes and the like. Therefore, it may be configured to capture the displacement of the object in the back side by using the out-camera.

The embodiments have explained the example of detecting an operation performed for the three-dimensional object; however, the present invention can also be used for detecting an operation performed for a two-dimensional object. For example, when touches of the fingers on both sides of an icon displayed on the touch panel are detected, and, thereafter, this state is maintained for a longer period of time than a predetermined time, or the distance between the fingers is maintained substantially constant for the longer period of time than the predetermined time, then the icon may be set in the selected state.

The embodiments are configured that the display device singly detects an operation performed for the three-dimensional object; however, the display device may collaborate with a server to detect an operation performed for the three-dimensional object. In this case, the display device successively transmits information detected by the detector to the server, and the server detects the operation to notify the display device of the detection result. Such a configuration as above enables the load of the display device to be reduced.

The advantages are that one embodiment of the invention provides a display device that can provide the user with convenient operations.

What is claimed is:

1. A display device, comprising:
    a display unit configured to stereoscopically display a display object at an initial position;
    a detecting unit configured to detect a first object and a second object in a three-dimensional space where the display object is three-dimensionally visible; and
    a control unit configured to
        set the display object to a tentatively selected state in response to a detection of a first arrangement in which the display object at the initial position is located between the first object and the second object in the three-dimensional space,
        maintain the display object, that has been set to the tentatively selected state, at the initial position, when the first object and the second object move from the first arrangement to a second arrangement in which a relative position of the first and second objects to said display object is different from the first arrangement, and then
        move the display object from the initial position to a position between the first object and the second object, when a distance between the first object and the second object is not widened for a longer period of time than a predetermined time in the second arrangement.

2. The display device according to claim 1, wherein the first arrangement in which the display object is located between the first object and the second object includes a case in which a line connecting between the first object and the second object intersects a display surface of the display unit.

3. The display device according to claim 1, wherein the detecting unit is configured to detect a first state in which the display object is located between the first object and the second object, and the control unit is configured to change the display object when the first state is detected.

4. The display device according to claim 1, wherein the detecting unit is configured to detect a second state in which the display object is located between the first object and the second object for a longer period of time than a predetermined time, and the control unit is configured to change the display object when the second state is detected.

5. The display device according to claim 1, wherein the detecting unit is configured to detect a third state in which the display object is located between the first object and the second object and a distance between the first object and the second object is not widened for a longer period of time than a predetermined time, and the control unit is configured to change the display object when the third state is detected.

6. The display device according to claim 1, wherein the detecting unit is configured to detect a fourth state in which at least one of the first object and the second object is moved after the display object is located between the first object and the second object and a distance between the first object and the second object is not widened for a longer period of time than a predetermined time, and the control unit is configured to start changing the display object from when the movement is detected.

7. The display device according to claim 6, wherein, the control unit is configured to display a reverse change representing that the change of the display object is returned to its original state, when at least one of the first object and the second object is moved after the display object is located between the first object and the second object and the distance between the first object and the second object is widened before the predetermined time elapses.

8. The display device according to claim 7, wherein the control unit is configured to display the reverse change in a shorter time than a time taken by the change.

9. The display device according to claim 1, wherein the control unit is configured to change the display object by moving or rotating the display object or by combining the movement and the rotation with a movement of the first object or the second object.

10. The display device according to claim 1, wherein the control unit is configured to deform the display object in accordance with a movement of the first object or the second object.

11. The display device according to claim 1, wherein the control unit is configured to delete the display object in accordance with a movement of the first object or the second object.

12. A display device, comprising:
a display unit configured to stereoscopically display a display object at an initial position;
a detecting unit configured to detect a first object and a second object in a three-dimensional space where the display object is three-dimensionally visible; and
a control unit configured to
set the display object to a tentatively selected state in response to a detection of a first arrangement in which at least one of the first object and the second object is in contact with the display object at the initial position in the three-dimensional space,
maintain the display object, that has been set to the tentatively selected state, at the initial position,
when the first object and the second object move from the first arrangement to a second arrangement in which a relative location of the first and second objects to said display object is different from the first arrangement, and then
move the display object from the initial position to a position between the first object and the second object where the display object is again in contact with said at least one of the first object and the second object that was in contact with the display object in the first arrangement,
when a distance between the first object and the second object is not widened for a longer period of time than a predetermined time in the second arrangement.

13. The display device according to claim 12, wherein the first arrangement in which said at least one of the first object and the second object is in contact with the display object in the three-dimensional space includes a case in which a line connecting between the first object and the second object intersects a display surface of the display unit.

14. The display device according to claim 12, wherein the detecting unit is configured to detect a first state in which at least one of the first object and the second object is in contact with the display object for a longer period of time than a predetermined time, and the control unit is configured to change the display object when the first state is detected.

15. The display device according to claim 12, wherein the detecting unit is configured to detect a second state in which at least one of the first object and the second object is in contact with the display object and a distance between the first object and the second object is not widened for a longer period of time than a predetermined time, and the control unit is configured to change the display object when the second state is detected.

16. The display device according to claim 12, wherein, the control unit is configured to display a reverse change representing that the change of the display object is returned to its original state, when
at least one of the first object and the second object is moved after at least one of the first object and the second object is brought into contact with the display object, and
it is detected that the distance between the first object and the second object is widened before the predetermined time elapses.

17. The display device according to claim 16, wherein the control unit is configured to display the reverse change in a shorter time than a time taken by the change.

18. The display device according to claim 12, wherein the control unit is configured to change the display object by moving or rotating the display object or by combining the movement and the rotation with a movement of the first object or the second object.

19. The display device according to claim 12, wherein the control unit is configured to change the display object by deforming the display object in accordance with a movement of the first object or the second object.

20. The display device according to claim 12, wherein the control unit is configured to change the display object by deleting the display object in accordance with a movement of the first object or the second object.

21. A display device, comprising:
a display unit configured to stereoscopically display a display object at an initial position on a display surface of the display unit;
a detecting unit configured to detect a first object and a second object on the display surface; and
a control unit configured to
set the display object to a tentatively selected state in response to a detection of a first arrangement in which the display object at the initial position is located between the first object and the second object on the display surface,
maintain the display object, that has been set to the tentatively selected state, at the initial position,
when the first object and the second object move from the first arrangement to a second arrangement in which a relative position of the first and second objects to said display object is different from the first arrangement, and then
move the display object from the initial position to a position between the first object and the second object, when a distance between the first object and the second object is not widened for a longer period of time than a predetermined time in the second arrangement.

22. A display device, comprising:
a display unit configured to stereoscopically display a display object at an initial position on a display surface of the display unit;
a detecting unit configured to detect a first object and a second object on the display surface; and
a control unit configured to
set the display object to a tentatively selected state in response to a detection of a first arrangement in which at least one of the first object and the second object is in contact with the display object at the initial position on the display surface,
maintain the display object, that has been set to the tentatively selected state, at the initial position,
when the first object and the second object move from the first arrangement to a second arrangement in which a relative location of the first and second objects to said display object is different from the first arrangement, and then
move the display object from the initial position to a position between the first object and the second object where the display object is again in contact with said at least one of the first object and the second object that was in contact with the display object in the first arrangement,
when a distance between the first object and the second object is not widened for a longer period of time than a predetermined time in the second arrangement.

23. A display device, comprising:
a display unit configured to stereoscopically display a display object;
a detecting unit configured to detect a first object and a second object in a three-dimensional space where the display object is three-dimensionally visible; and
a control unit configured to change the display object in response to a detection of at least one of the first object and the second object being in contact with the display object in the three-dimensional space,
wherein the control unit is configured to tentatively select the display object when the display object is contacted by one of the first object and the second object.

24. A display device, comprising:
a display unit configured to display a display object which is three-dimensionally visible on a display surface of the display unit;
a detecting unit configured to detect a first object and a second object on the display surface; and
a control unit configured to change the display object when it is detected that at least one of the first object and the second object is in contact with the display object on the display surface,
wherein the control unit is configured to tentatively select the display object when the display object is contacted by one of the first object and the second object.

* * * * *